(12) United States Patent
Lilja

(10) Patent No.: US 8,495,550 B2
(45) Date of Patent: Jul. 23, 2013

(54) SOFT ERROR HARD ELECTRONIC CIRCUIT AND LAYOUT

(76) Inventor: Klas Olof Lilja, Pleasanton, CA (US)

( * ) Notice: Subject to any disclaimer, the term of this patent is extended or adjusted under 35 U.S.C. 154(b) by 224 days.

(21) Appl. No.: 12/763,139

(22) Filed: Apr. 19, 2010

(65) Prior Publication Data

US 2010/0264953 A1 Oct. 21, 2010

Related U.S. Application Data

(63) Continuation-in-part of application No. 12/354,655, filed on Jan. 15, 2009, now abandoned.

(60) Provisional application No. 61/214,071, filed on Apr. 20, 2009, provisional application No. 61/335,845, filed on Jan. 12, 2010, provisional application No. 61/336,027, filed on Jan. 15, 2010, provisional application No. 61/338,710, filed on Feb. 23, 2010.

(51) Int. Cl.
| | |
|---|---|
| G06F 17/50 | (2006.01) |
| G06F 9/455 | (2006.01) |
| H03K 19/003 | (2006.01) |
| H03K 19/173 | (2006.01) |

(52) U.S. Cl.
USPC ........... 716/130; 716/101; 716/104; 716/106; 716/112; 716/119; 716/132; 716/55; 326/10; 326/46; 326/47

(58) Field of Classification Search
USPC ................. 716/101, 103, 104, 106, 109, 119, 716/132, 112; 365/154, 206, 208; 714/37, 714/741, 799
See application file for complete search history.

(56) References Cited

U.S. PATENT DOCUMENTS

| | | | | |
|---|---|---|---|---|
| 6,127,864 | A  * | 10/2000 | Mavis et al. | 327/144 |
| 6,278,287 | B1 * | 8/2001 | Baze | 326/9 |
| 6,433,983 | B1 * | 8/2002 | Fechner | 361/111 |
| 6,703,858 | B2 * | 3/2004 | Knowles | 326/9 |
| 7,023,235 | B2 * | 4/2006 | Hoff | 326/10 |
| 7,075,337 | B2 * | 7/2006 | Wood et al. | 326/95 |
| 7,139,190 | B1 * | 11/2006 | de Jong | 365/154 |
| 7,298,010 | B1 * | 11/2007 | Ma | 257/359 |
| 7,310,759 | B1 * | 12/2007 | Carmichael et al. | 714/725 |
| 7,327,197 | B2 * | 2/2008 | Kriz | 331/17 |
| 7,343,579 | B2 * | 3/2008 | Coxe et al. | 716/101 |
| 7,504,703 | B2 * | 3/2009 | Yoshida | 257/499 |
| 7,505,300 | B2 * | 3/2009 | Namekawa et al. | 365/94 |
| 7,515,452 | B1 * | 4/2009 | de Jong et al. | 365/54 |

(Continued)

OTHER PUBLICATIONS

Amusan et al.; "Single Event Upsets in a 130 nm Hardened Latch Design Due to Charge Sharing"; Publication Year: 2007; Reliability physics symposium, 2007. proceedings. 45th annual. ieee international; pp. 306-311.*

(Continued)

Primary Examiner — Helen Rossoshek
(74) Attorney, Agent, or Firm — K&L Gates LLP

(57) ABSTRACT

This invention comprises a layout method to effectively protect electronic circuits against soft errors (non-destructive errors) and circuit cells, which are protected against soft errors. The invention applies a layout method to sequential and combinational logic to generate specific circuit cells with netlists and layouts which are hardened against single event generated soft-errors. It also devices methods of how two or more such cells should be laid out and placed relative to each other, in order to have the best global soft-error protection.

10 Claims, 31 Drawing Sheets

U.S. PATENT DOCUMENTS

| | | | | |
|---|---|---|---|---|
| 7,523,422 B2* | 4/2009 | Zhu et al. | | 716/132 |
| 7,529,118 B2* | 5/2009 | Burleson et al. | | 365/156 |
| 7,576,583 B2* | 8/2009 | Kuboyama et al. | | 327/218 |
| 7,620,883 B1* | 11/2009 | Carmichael et al. | | 714/797 |
| 7,627,840 B2* | 12/2009 | Kleinosowski et al. | | 716/106 |
| 7,644,311 B2* | 1/2010 | Lien et al. | | 714/37 |
| 7,733,144 B2* | 6/2010 | Guo et al. | | 327/203 |
| 7,759,995 B2* | 7/2010 | Ishii et al. | | 327/214 |
| 7,761,828 B2* | 7/2010 | Miczo | | 716/103 |
| 7,772,874 B2* | 8/2010 | Rezgui et al. | | 326/21 |
| 7,773,442 B2* | 8/2010 | Kapre et al. | | 365/206 |
| 7,774,732 B2* | 8/2010 | KleinOsowski et al. | | 716/119 |
| 7,907,461 B1* | 3/2011 | Nguyen et al. | | 365/206 |
| 7,961,501 B1* | 6/2011 | Ryan | | 365/154 |
| 7,965,540 B2* | 6/2011 | Cannon et al. | | 365/156 |
| 2007/0050740 A1* | 3/2007 | Jacobi et al. | | 716/5 |
| 2007/0141794 A1* | 6/2007 | Morris | | 438/294 |
| 2007/0236246 A1* | 10/2007 | Roper | | 326/9 |
| 2007/0242537 A1* | 10/2007 | Golke et al. | | 365/194 |
| 2008/0158747 A1* | 7/2008 | Voldman | | 361/56 |
| 2008/0290903 A1* | 11/2008 | Mo | | 327/5 |
| 2009/0044158 A1* | 2/2009 | Lilja | | 716/5 |
| 2009/0204933 A1* | 8/2009 | Rezgui | | 716/10 |
| 2009/0322411 A1* | 12/2009 | Moyer et al. | | 327/526 |
| 2011/0175197 A1* | 7/2011 | Furuta | | 257/544 |
| 2011/0309856 A1* | 12/2011 | Cabanas-Holmen et al. | | 326/9 |
| 2012/0180005 A1* | 7/2012 | Lilja | | 716/50 |
| 2012/0185816 A1* | 7/2012 | Lilja | | 716/119 |
| 2013/0038348 A1* | 2/2013 | Lilja | | 326/46 |

OTHER PUBLICATIONS

Wang et al.; "Low-Overhead SEU-Tolerant Latches"; Publication Year: 2007; Microwave and Millimeter Wave Technology, 2007. ICMMT '07. International Conference on; pp. 1-4.*

Lee et al.; "LEAP: Layout Design through Error-Aware Transistor Positioning for soft-error resilient sequential cell design"; Publication Year: 2010; Reliability Physics Symposium (IRPS), 2010 IEEE International; pp. 203-212.*

Lee et al.; "Design Framework for Soft-Error-Resilient Sequential Cells"; Publication Year: 2011; Nuclear Science, IEEE; Transactions on; vol. 58, Issue: 6, Part: 1; pp. 3026-3032.*

Amusan et al.; "Mitigation techniques for single event induced charge sharing in a 90 nm bulk CMOS process"; Publication Year: 2011; Reliability Physics Symposium, 2008. IRPS 2008. IEEE International; pp. 468-472.*

Amusan et al.; "Directional Sensitivity of Single Event Upsets in 90 nm CMOS Due to Charge Sharing"; Publication Year: 2007; Nuclear Science, IEEE Transactions on; vol. 54, Issue: 6, Part: 1; pp. 2584-2589.*

Naseer et al.; "DF-DICE: a scalable solution for soft error tolerant circuit design"; Publication Year: 2006; Circuits and Systems, 2006. ISCAS 2006. Proceedings. 2006 IEEE International Symposium on;.*

Casey et al.; "Single-Event Tolerant Latch Using Cascode-Voltage Switch Logic Gates"; Publication Year: 2006; Nuclear Science, IEEE Transactions on; vol. 53, Issue: 6, Part: 1; pp. 3386-3391.*

Amusan et al.; Single Event Upsets in a 130 nm Hardened Latch Design Due to Charge Sharing; Publication Year: 2007; Reliability physics symposium, 2007. proceedings. 45th annual. ieee international; p. 306.*

Blum et al.; "Multiple node upset mitigation in TPDICE-based pipeline memory structures"; Publication Year: 2008; Circuits and Systems, 2008. MWSCAS 2008. 51st Midwest Symposium on; pp. 314-317.*

* cited by examiner

SOFT ERROR HARD ELECTRONIC CIRCUIT AND LAYOUT

CROSS-REFERENCE TO RELATED APPLICATIONS

The present application is a continuation in part from U.S. application Ser. No. 12/354,655 filed Jan. 15, 2009 now abandoned. Further, this application incorporates and claims the benefit of the following U.S. provisional applications which are included herein by reference:
U.S. 61/214,071 filed Apr. 20, 2009
U.S. 61/335,845 filed Jan. 12, 2010
U.S. 61/336,027 filed Jan. 15, 2010
U.S. 61/338,710 filed Feb. 23, 2010

GOVERNMENT SUPPORT

This invention was made with Government support under contract HDTRA1-09-P0011 awarded by DTRA. The Government has certain rights in the invention.

REFERENCE TO SEQUENCE LISTING, TABLE, ETC

Not Applicable.

BACKGROUND OF THE INVENTION

This invention comprises a layout method to effectively protect logic circuits against soft errors (non-destructive errors) and circuit cells, with layout, which are protected against soft errors.

Current radhard-by-design technology for single event errors include triplication (triple mode redundancy, TMR) or duplication (e.g., built-in soft-error resilience, BiSER). These circuits carry two or more redundant copies of a signal, and use some form of voting, or filtering, circuitry to determine the correct signal among the redundant signals. Filtering preventing a signal to pass in the case that one of the redundant signals is wrong (by comparing the value of the redundant signals), and voting circuits selects the correct signal from the majority among several (3 or more) redundant signals. These techniques generate undesirable power and area overhead, and current versions of these techniques cannot handle MBUs or SEMUs. Error correction codes, ECC, for memory, which also (loosely) could be classified as RHBD, is more efficient than duplication/triplication and can, with additional overhead, handle multiple errors in memory circuitry. However, the application of a corresponding error correction to logic circuits is very limited and application specific (e.g., selective parity check or insertion of specialized checking circuit IP).

State-of-the art for layout techniques for soft-error hard design mainly consist of simple spacing and sizing, and in adding additional contacts. The circuit cells and layout methodology in patent (US2009/0184733), on which the new inventions in this application are built, are a new way to protect against soft-errors using layout design techniques.

BRIEF SUMMARY OF THE INVENTION

This invention comprises a layout method to effectively protect electronic circuits against soft errors (non-destructive errors) and circuit cells, with layout, which are protected against soft errors. It is based on U.S. patent application Ser. No. 12/354,655.

The invention applies the method of Ser. No. 12/354,655 to sequential and combinational logic to generate specific circuit cells with netlists and layouts which are hard against single event generated soft-errors. It also devices methods of how two or more such cells should be laid out and placed relative to each other, in order to have the best global soft-error protection.

DETAILED DESCRIPTION OF INVENTION

This invention consists of circuits and layouts that reduce or remove the effects of radiation generated soft-errors in logic and memory circuits.

In U.S. patent application Ser. No. 12/354,655, a layout methodology is described which provides a general method and steps to generate a radhard layout. The invention in this patent application concerns specific circuit cells for with layouts generated according to this methodology.

In the layout methodology of U.S. patent application Ser. No. 12/354,655, an analysis is performed which classifies all the contact area in the layout according to the effect of a single event at this node on the total circuit under consideration. The nodes are then placed in the layout such that, when a single event affects several nodes, the single event effects are opposite and tend to cancel. This entails a placement of layout contact areas that have opposite effects on the circuit state closed to each other, whereas areas for which a single event has the same effect on the circuit, are not placed close to each other. Furthermore, in the latter case, a third contact area, for which a single event has the opposite effect, can, when possible, be placed between the first two areas. U.S. patent application Ser. No. 12/354,655 also details how the technique is applied to circuits that use redundant nets, including the Dual Interlocked Cell (DICE) storage cell.

Figure 1:
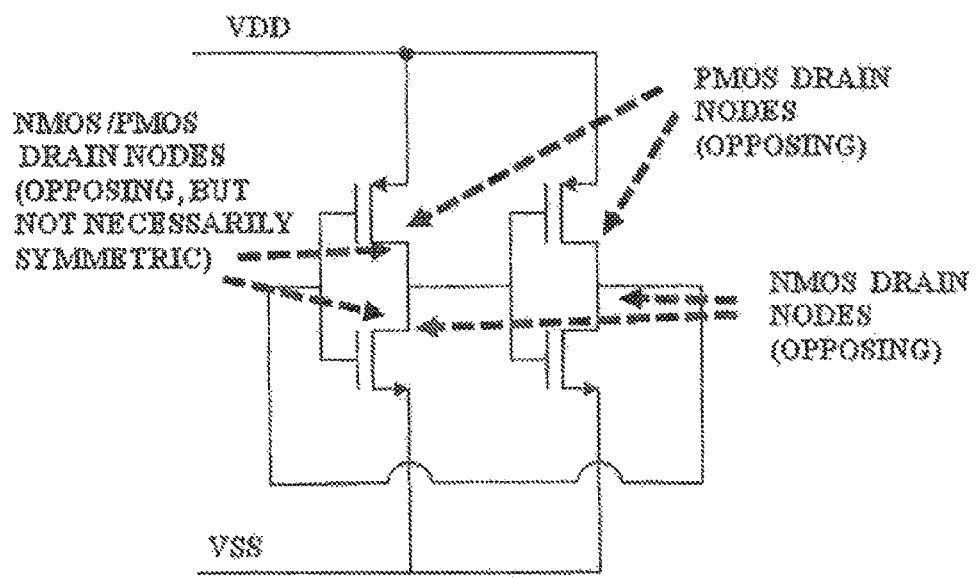
FIG. 1. Primary opposing nodes in a latch cell.
Figure 2:
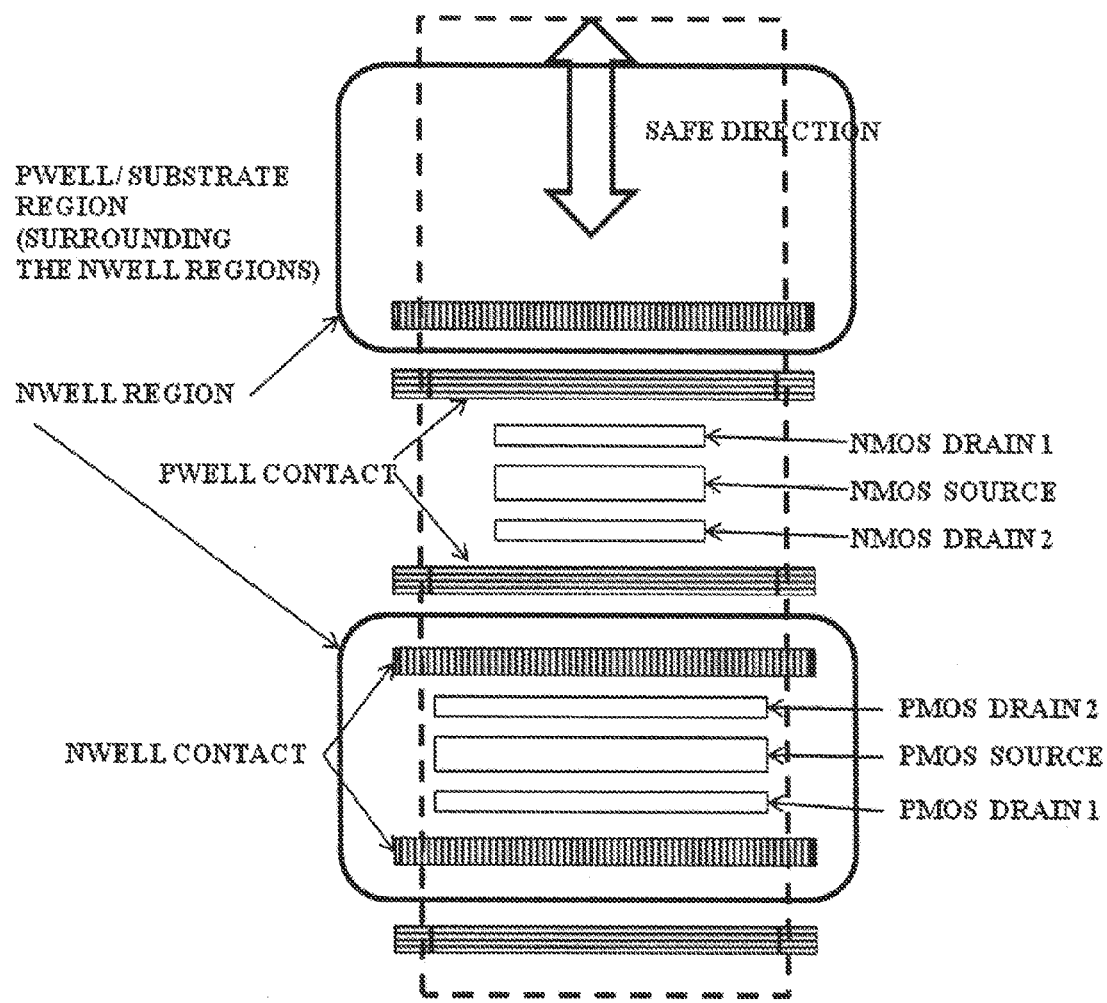
FIG. 2. A principal arrangement of opposing node of a latch circuit.
Figure 3:
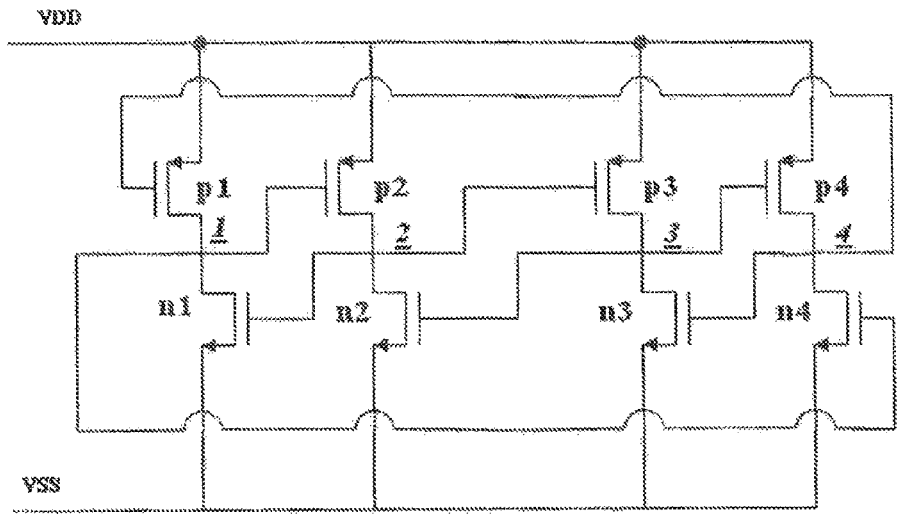
FIG. 3. Basic netlist for the DICE latch cell (prior art [Nic05]) with nodes 1-4. p1-p4 and n1-n4 are the pMOSFET drains and the nMOSFET drains, respectively.
Figure 4:
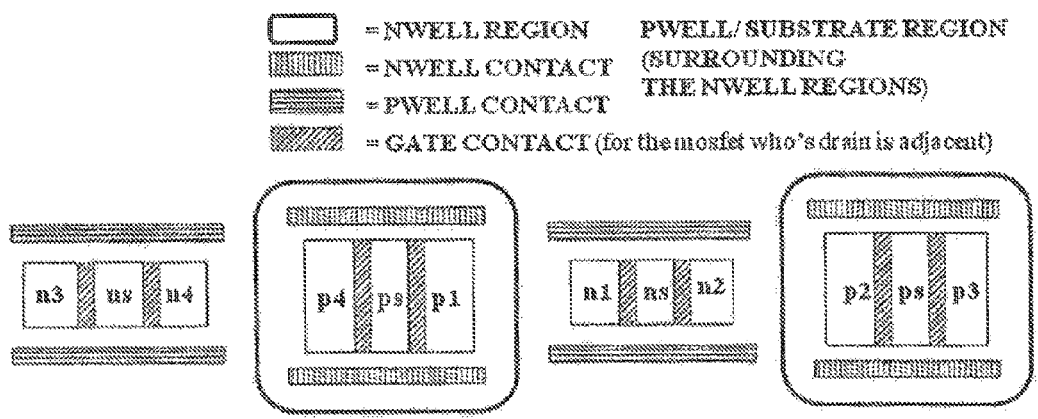
FIG. 4. A first preferred layout arrangement for the layout of the DICE latch cell. ns/ps are the source contacts for the two mosfets who's drains are adjacent. p1-p4 and n1-n4 are the pMOSFET drains and the nMOSFET drains of the 4 main storage nodes, respectively. Any cyclic simultaneous permutation of the n and p nodes will be equivalent (and part of the invention). The mosfets can be placed in separate active areas, or the adjacent n and p nodes can be placed in the same active area. The MOSFET sources can be placed in the line of the drains or in the direction vertical to the line of the drain nodes. The well contacts can be placed on either side only, or also surround the adjacent node pairs. The nodes can also be arranged in a different order subject to the following rules: two adjacent n-drains, or two adjacent p-drains are always an odd/even pair (e.g., p1 & p2, or n2 and n3), adjacent n-drain to p-drain are always an odd/odd or and even/even pair (e.g., n2 & p2, or p3 & n1).
Figure 5:
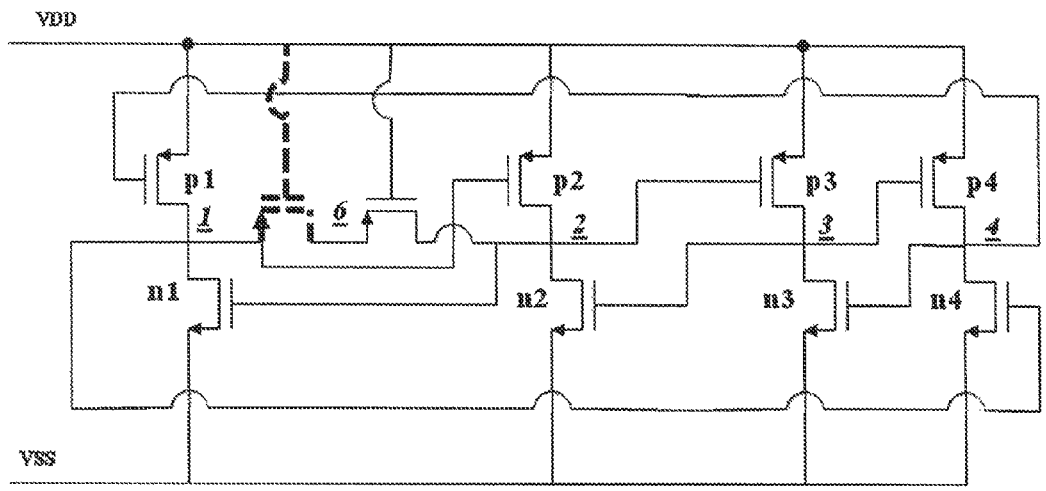
FIG. 5. Net-list corresponding to the second preferred arrangement. The yellow MOSFET may or may not be included, as long as node 6 is connected to drain 6a in FIG. 5, and p1 and 6a are physically separate.
Figure 6:
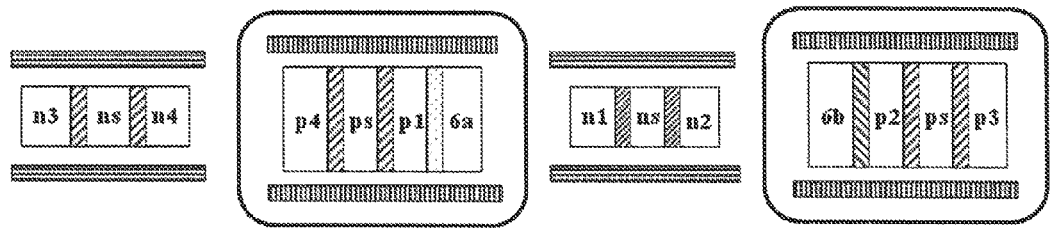
FIG. 6. A second preferred layout arrangement. ns/ps are the source contacts for the two mosfets whose drains are adjacent. Node 6a and 6b are connected. The yellow gate adjacent to node 6a may or may not be included (both variants included in the claims), but p1 and 6a are physically separate. The layout derives from the layout in FIG. 1, and the same variants w.r.t. node permutations, active, source, and well contact arrangements apply.
Figure 7:
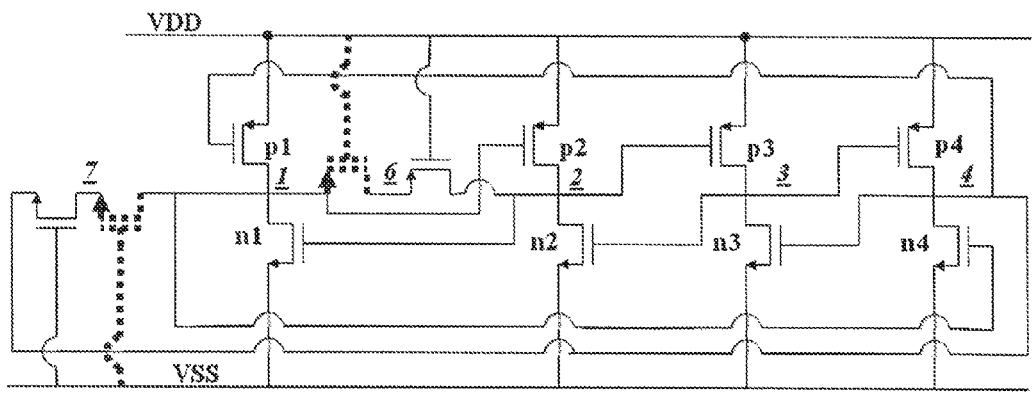
FIG. 7. Net-list corresponding to the third preferred arrangement. The yellow MOSFET may or may not be included, as long as node 6 is connected to drain 6a in FIG. 4, and p1 and 6a are physically separate, and node 7 is connected to drain 7a in FIG. 4, and n1 and 7a are physically separate.
Figure 8:
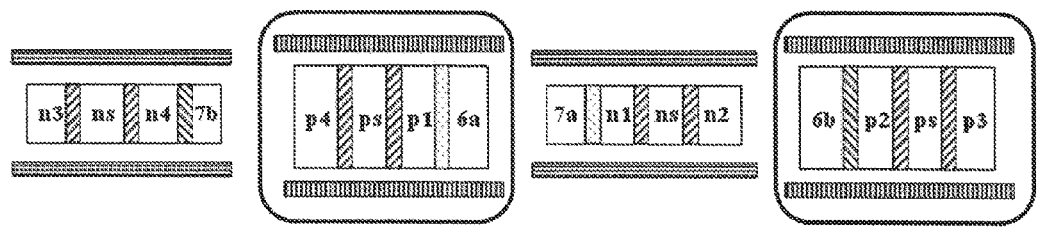
FIG. 8. A third preferred layout arrangement. ns/ps are the source contacts for the two mosfets who's drains are adjacent. Node 6a-6b are connected, as are node 7a/7b. The yellow gate adjacent to node 6a and 7a may or may not be included (both variants included in the claims), but the adjacent drain areas are physically separate. The layout derives from the layout in FIG. 1, and the same variants w.r.t. node permutations, active, source, and well contact arrangements apply.
Figure 9:
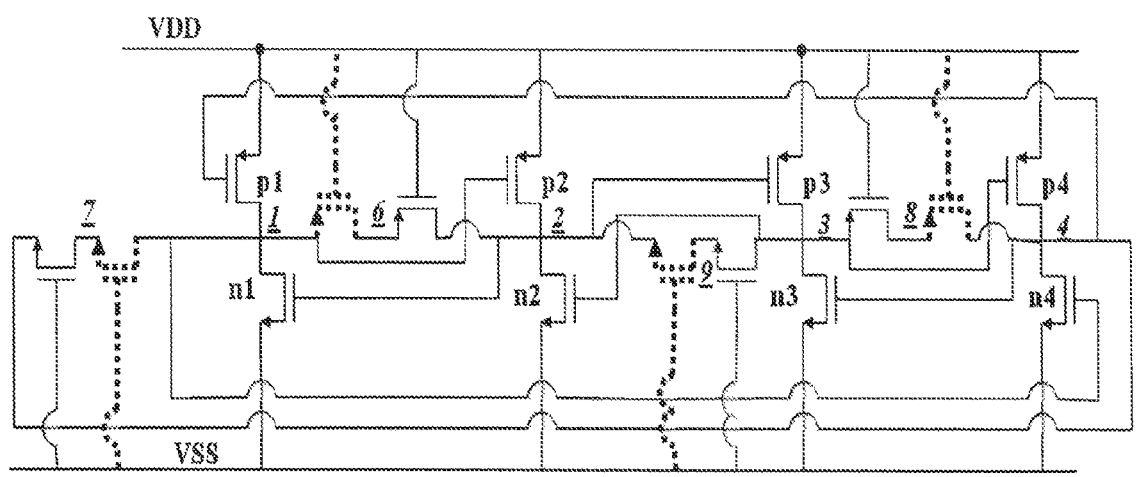
FIG. 9. Net-list corresponding to the fourth preferred arrangement. The yellow MOSFET may or may not be included, as long as node 6 is connected to drain 6a, 7 to 7a, 8 to 8a, and 9 to 9a in FIGS. 8, and 6a, 7a, 8a, 9a are physically separate from their adjacent main drain node.
Figure 10:
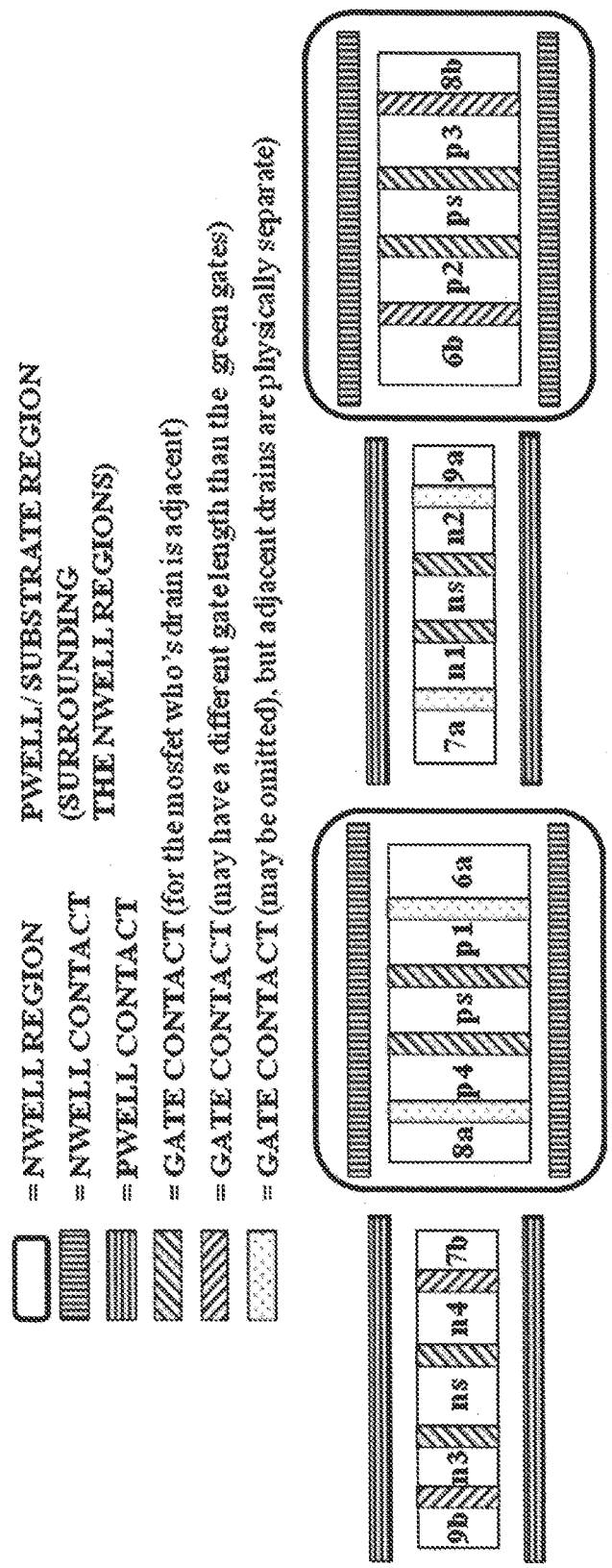
FIG. 10. A fourth preferred layout arrangement. ns/ps are the source contacts for the two mosfets whose drains are adjacent. Node 6a/6b, 7a/7b, 8a/8b, and 9a/9b are connected. The yellow gates adjacent to nodes 6a, 7a, 8a, 9a may or may not be included (both variants included in the claims), but nodes 6a, 7a, 8a, 9a are physically separate from their adjacent MOSFET drains. The layout derives from the layout in FIG. 1, and the same variants w.r.t. node permutations, active, source, and well contact arrangements apply. Naturally the claims also cover the various additional variants where and combination of the extra nodes 6a/6b, 7a/7b, 8a/8b, 9a/9b have been included or omitted.
Figure 11:
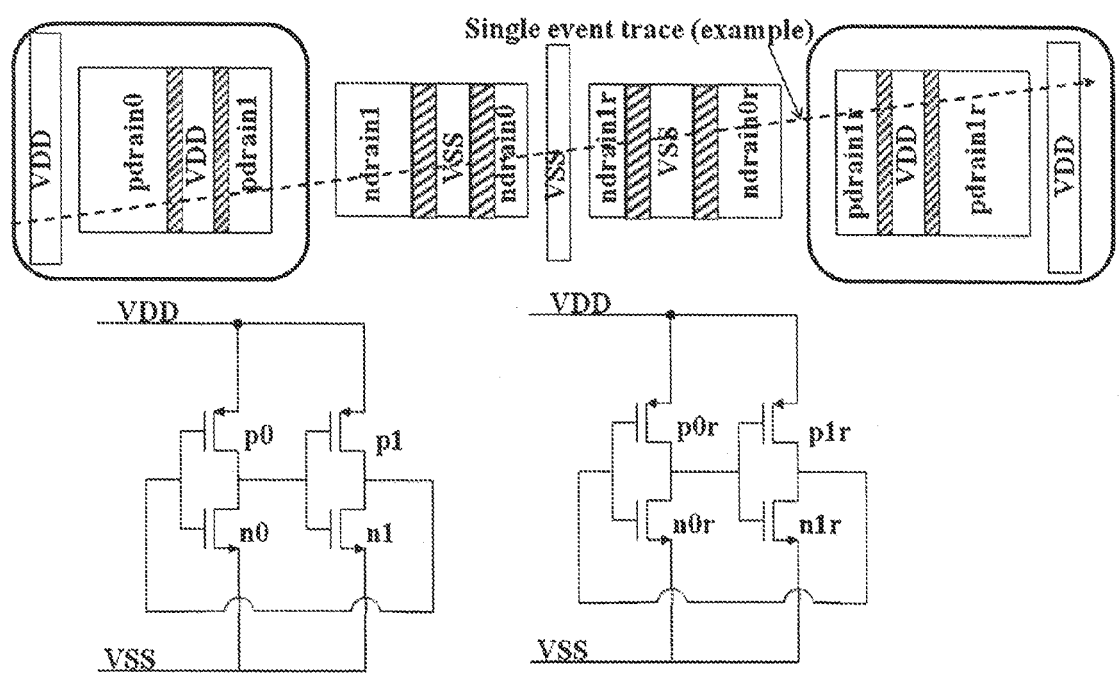
FIG. 11. Circuit schematic and layout for duplicated latch cells (e.g. for BISER) using placement and sizing to ensure complete hardness against single and multiple node single event effects. For a single event affecting several nodes, the primary latch can only be upset when node 1 is HIGH, and the redundant latch can only be upset when node 1 (*r*) is LOW. Hence, any single event that affects both latches, can only upset one of the two latches in the BISER configuration, and therefore, cannot generate an error.
Figure 12:
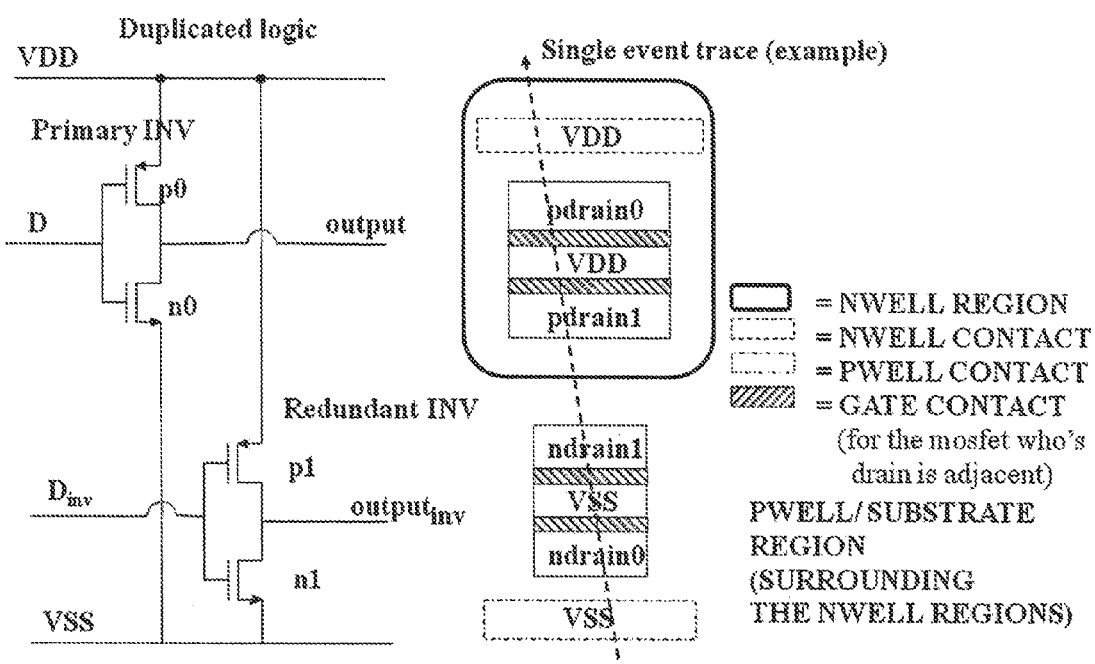
FIG. 12. Example of a duplicated circuit of claims 9 AND 10. In a duplicated inverter where the redundant and primary nodes carry opposite states, error signals on both primary and redundant nodes can be generated if both ndrain0 and pdrain1 are affected (if D is high) or if both ndrain1 and pdrain0 are affected (D low). By placing the nodes such, that if a particle trace goes through two nodes that can cause an error transient on both primary and redundant output, then the trace also passes through the other nodes and the pulse on one of the nets are suppressed. For example, consider the trace in the Figure; if node 0 is high, the charge collected on ndrain0 will pull node 0 low (error transient), the charge collected on node pdrain1 will pull node 1 high, however, the charge collected on node ndrain1 will pull node 1 low, opposing the effect on pdrain1, and keeping node 1 low (i.e., preventing the transient on node 1). If node 0 is low, the charge collected on node ndrain1, will pull node 1 low (error transient), however, the charge collected at ndrain0, will keep node 0 low (i.e., preventing a transient on node 0). If should be pointed out that in the general case there will be some pulses on all nodes, but that it will always hold true that a full swing pulse (a transient that can propagate) only can be generated on one, and one only, of the duplicated nodes.
Figure 13:
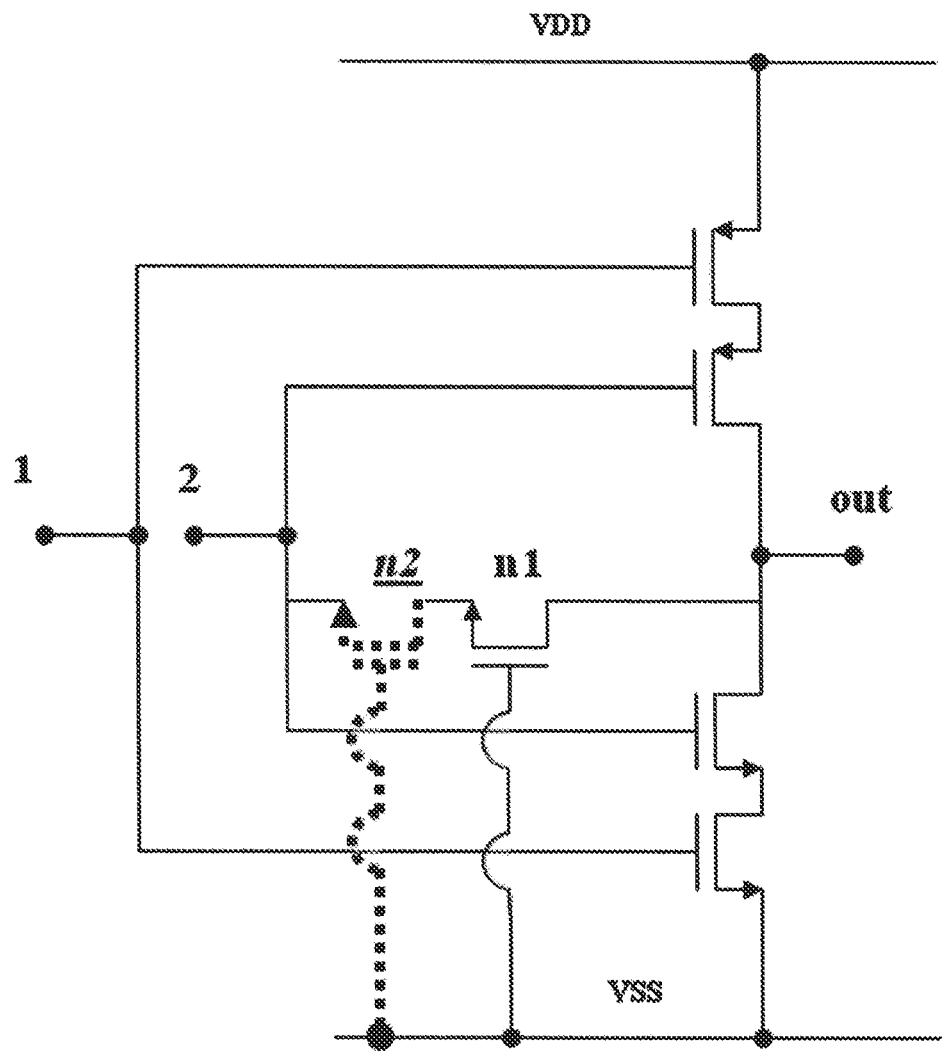
FIG. 13. Example of a adding protective MOSFET devices to a c-element filter circuit. The ndrain of the output of the c-element (i.e., a net which becomes floating if the two inputs have different voltage states) is connected, via the protection MOSFET n1, either to an n-type contact area close to the ndrain of the input net 2, or via a second protective MOSFET, n2, to the ndrain of the input net 2. This protection would be adequate when the layout is such that the ndrain of the c-element output and the ndrain of the input node 2 are the most sensitive contact area pair (i.e., that other mutually sensitive contact areas are further apart, and/or have other opposing contact areas in between them). As in the case of the DICE circuit more protective MOSFET devices can be added to protect other mutually sensitive contact area pair, if required.
Figure 14:
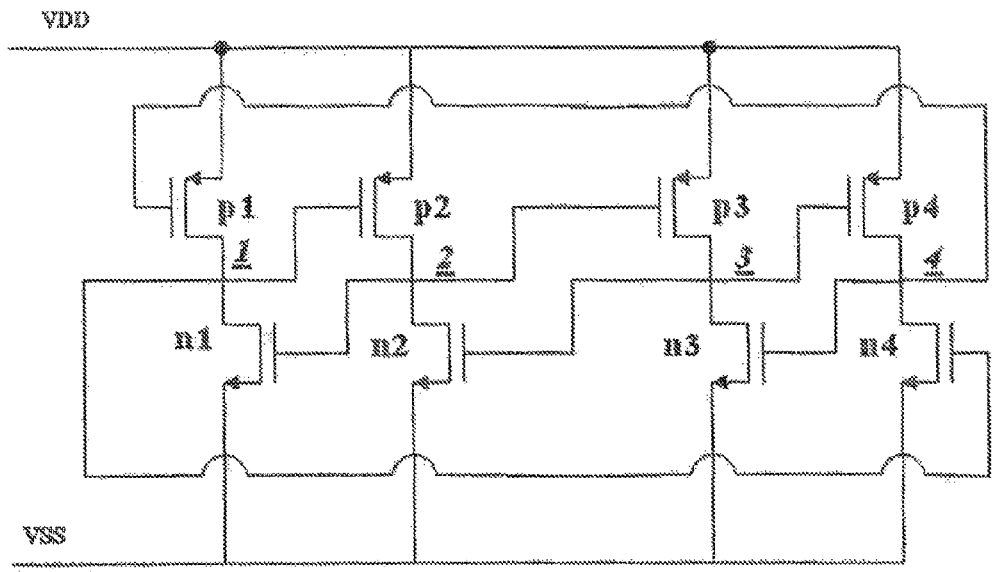
FIG. 14. Basic netlist for the DICE latch cell (prior art) with nodes 1-4. p1-p4 and n1-n4 are the pMOSFET drains and the nMOSFET drains, respectively.
Figure 15:
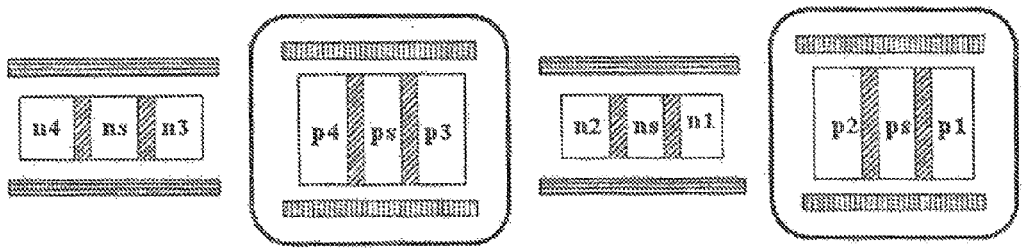
FIG. 15. Arrangement 1 of the nodes in a layout for the DICE schematics in FIG. 14. The nodes n1-n4 are the n-type MOSFET drains, and p1-p4 the p-type MOSFET drains, that are connected to node 1-4 respectively.
Figure 16:
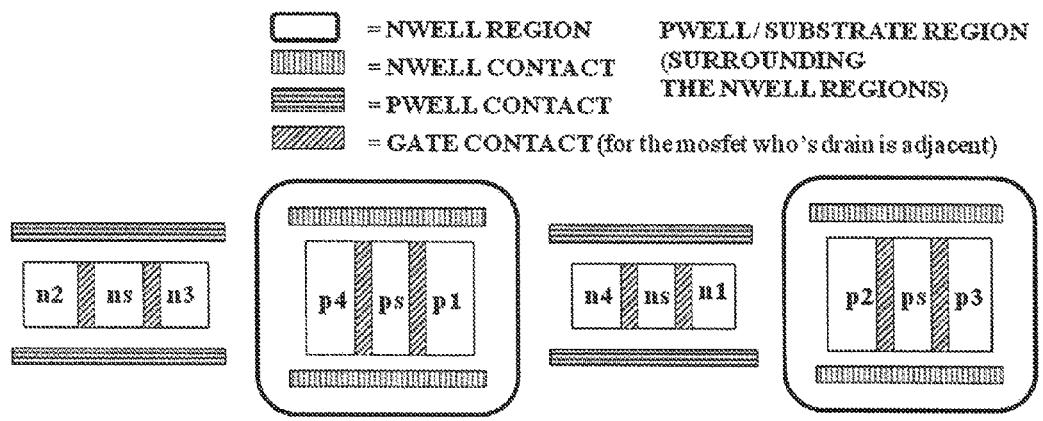
FIG. 16. Arrangement 2 of the nodes in a layout for the DICE schematics in FIG. 14. The nodes n1-n4 are the n-type MOSFET drains, and p1-p4 the p-type MOSFET drains, that are connected to node 1-4 respectively.
Figure 17:
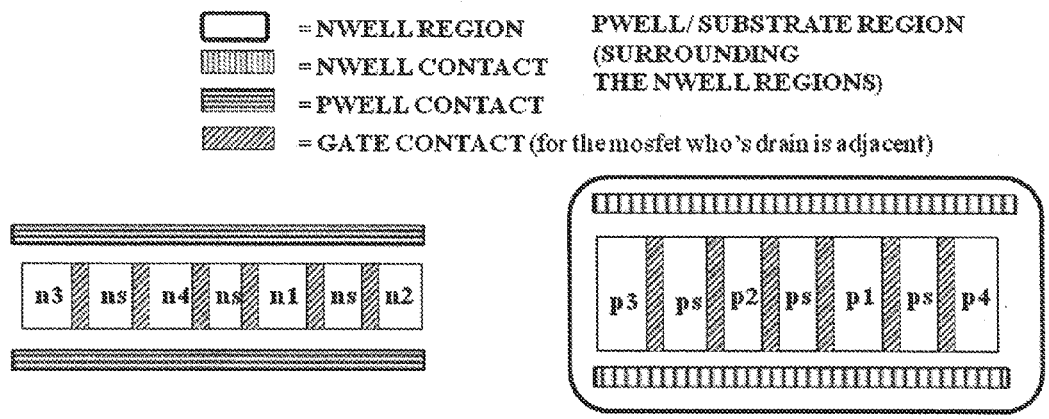
FIG. 17. Arrangement 3 of the nodes in a layout for the DICE schematics in FIG. 14. The nodes n1-n4 are the n-type MOSFET drains, and p1-p4 the p-type MOSFET drains, that are connected to node 1-4 respectively.
Figure 18:
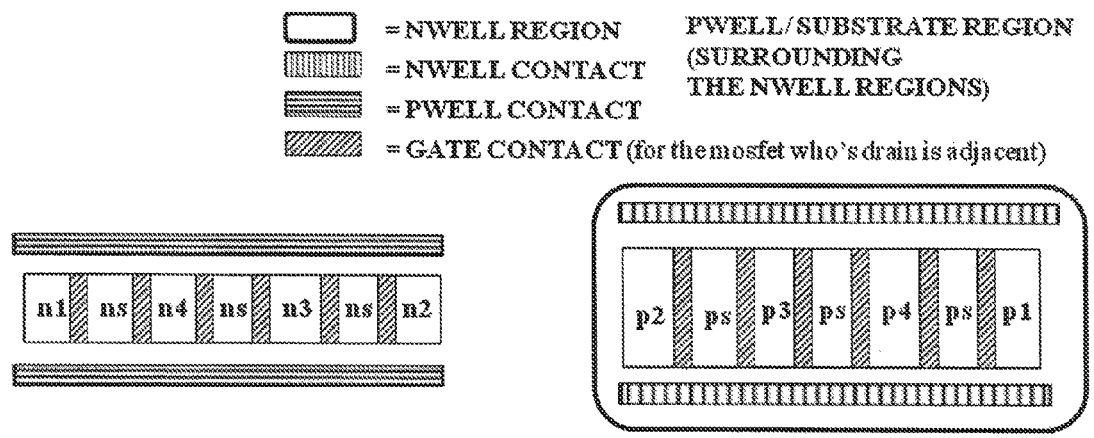
FIG. 18. Arrangement 4 of the nodes in a layout for the DICE schematics in FIG. 14. The nodes n1-n4 are the n-type MOSFET drains, and p1-p4 the p-type MOSFET drains, that are connected to node 1-4 respectively.
Figure 19:
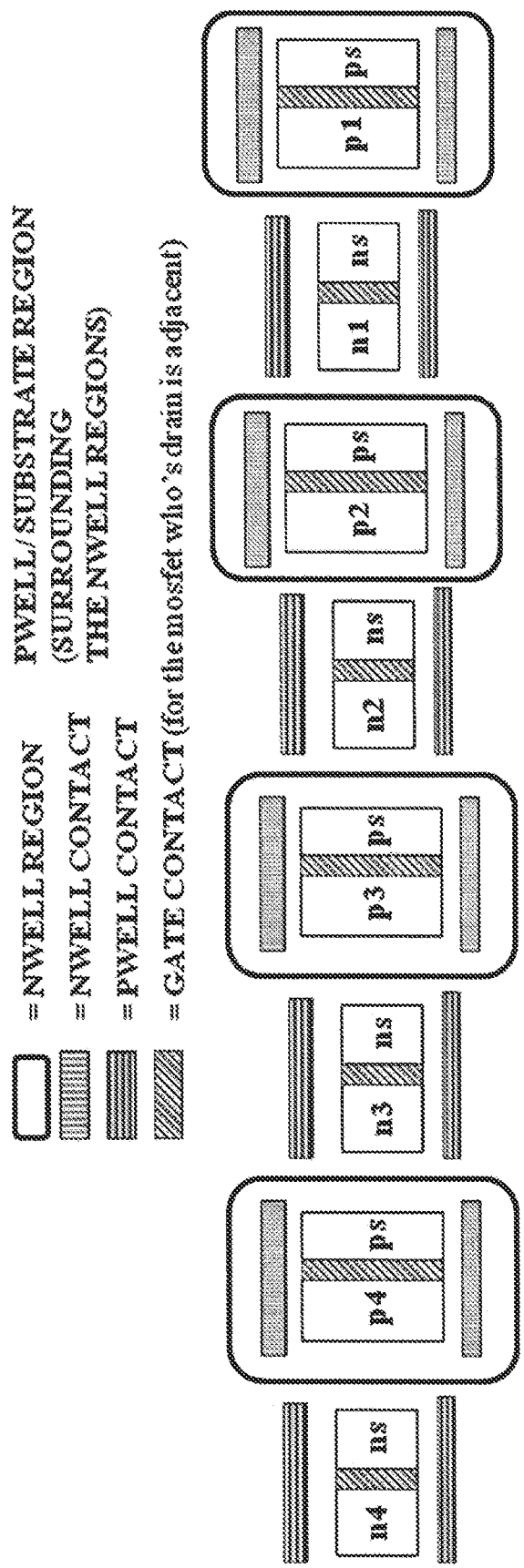
FIG. 19. Arrangement 5 of the nodes in a layout for the DICE schematics in FIG. 14. The nodes n1-n4 are the n-type MOSFET drains, and p1-p4 the p-type MOSFET drains, that are connected to node 1-4 respectively.

Certain elements of the invention concern the layout arrangements of different variants of the DICE storage cell. The basic circuit of the DICE is shown in FIG. 15. The DICE cell is a sequential logic storage cell, also called a latch, which comprises 4 inverter circuits (inverter circuit hereafter referred to as inverter). The output of each inverter are the 4 primary circuit nets of the DICE circuit. In the following these nets and inverters are numbered 1, 2, 3, 4, as shown in FIG. 15. A reference to the n'th net or inverter is taken to mean any one of the 4 inverter. A reference to the (n+1)'th inverter means the next inverter or net, and a reference to the (n−1)'the means the previous inverter or net. For example, if n is taken to be 2, i.e., the second inverter or net, then (n−1) is equal to 1, i.e., the first inverter or net, and (n+1) is 3, i.e., the third inverter or net. Furthermore, if such a numbering is cyclic (or periodic) then if n=1, (n−1) is taken to be 4, and if n=4, then (n+1) is 1. FIGS. 16-21 show different orderings of the main nodes in the DICE circuit, all generated according to the methodology in U.S. patent application Ser. No. 12/354,655, and detailed in claim number 1.

In an application of the DICE cell the basic circuit in FIG. 15 is extended with means to clock in data, and with possible additional devices such as input inverters and clock inverters, etc. Such extensions can be done in many different ways (applying various, prior art, clocking variants) in the basic layouts of the main DICE storage cell (from claim 1 and the claims in U.S. patent application Ser. No. 12/354,655). However, if these extensions are done in the special way, the beneficial properties of the basic layout can be maintained, or even improved. Firstly, the additional drain contact areas which can have a connection to the drain contact areas in the basic layout, should be placed along the same line as the basic areas. Secondly, they should be added so as to maintain the symmetry of the original layout, or to disturb this symmetry as little as possible. In other words, each contact area associated with a particular node, should to the extent possible, see the same surrounding as the corresponding contact areas associated with other nodes. If the particular circuit does not permit this, then, to the extent possible, the combination of two contact areas associated with two non-consecutive nodes (which carry the same signal), should see the same surrounding as the combination of the corresponding two contact areas associated with the other two nodes. The resulting layout should be such that when a single event affects several nodes the nodes that tend to bring the circuit into a certain state, should be balanced (as far as possible) by the nodes for which a single event has an opposite effect on the state of the circuit.

Figure 20:
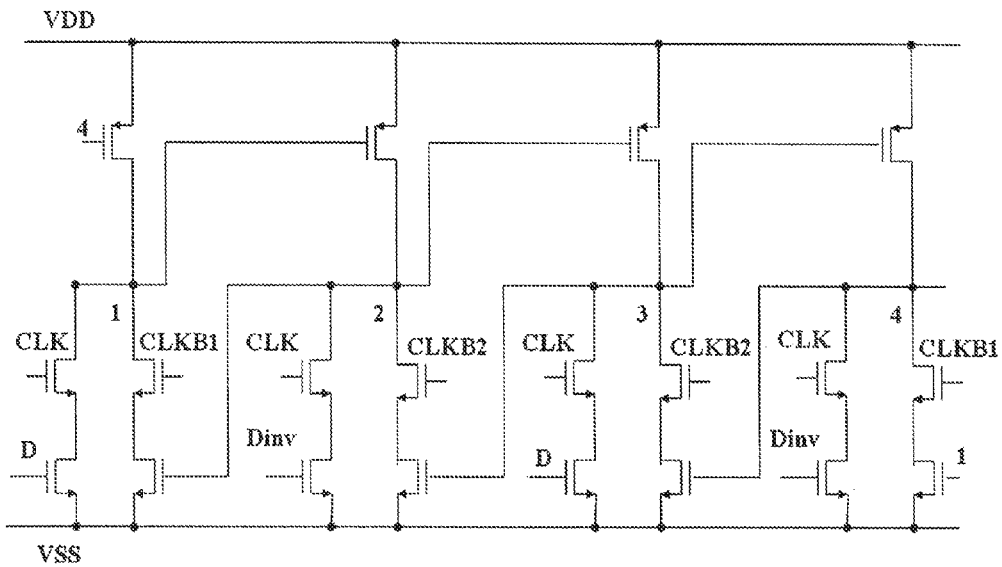
FIG. 20. Dual interlocked cell (DICE) latch with symmetric clocking D, and Dinv, are the data input and inverse of data input, respectively, CLK is the clock, and CLKB1 and CLKB2 are the inverse of the CLK. The inverse of the CLK is here included as two separate signals CLKB1 and CLKB2, the claims also cover the case where CLKB1 and CLKB2 are the same signal (e.g., if a CLKB is provided external to the cell).
Figure 21:
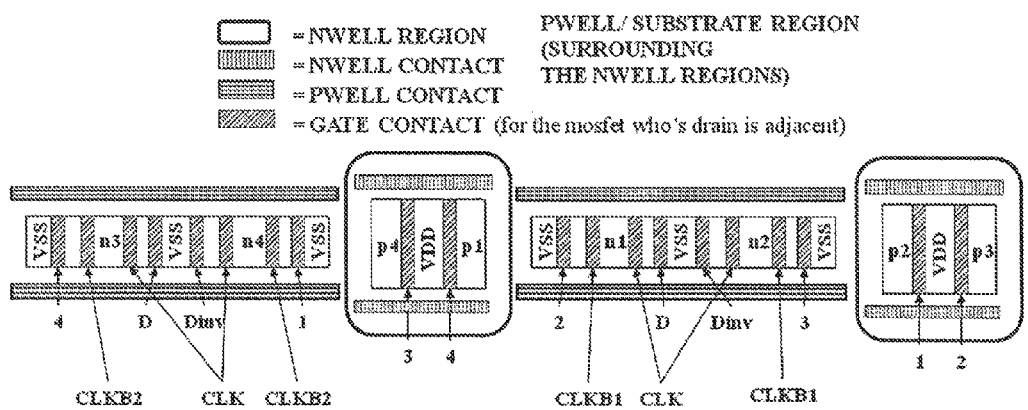
FIG. 21. Layout arrangement of the contact drain areas of the first, second, and third additional MOSFET for one of the ordering configurations of the net 1, 2, 3, and 4, for the DICE schematics in FIG. 20. The nodes n1-n4 are the n-type MOSFET drains, and p1-p4 the p-type MOSFET drains, that are connected to node 1-4 respectively. The drain areas of the additional MOSFETs are either shared with, or placed adjacent to, the drain contact area of the MOSFET, or the same type, to which they are connected. In cases where the signals Dinv, CLKB1, CLKB2 (Dinv is the inverse of the data signal, CLKB1, and CLKB2 are the inverse of the clocking signal CLK), are not available from external (to the cell) circuits, they can be generated by inserting 1 inverter (for Dinv), and one or two inverters for CLKB. These can be inserted along the line of the nodes in the layout in this figure or in other manners.
Figure 22:
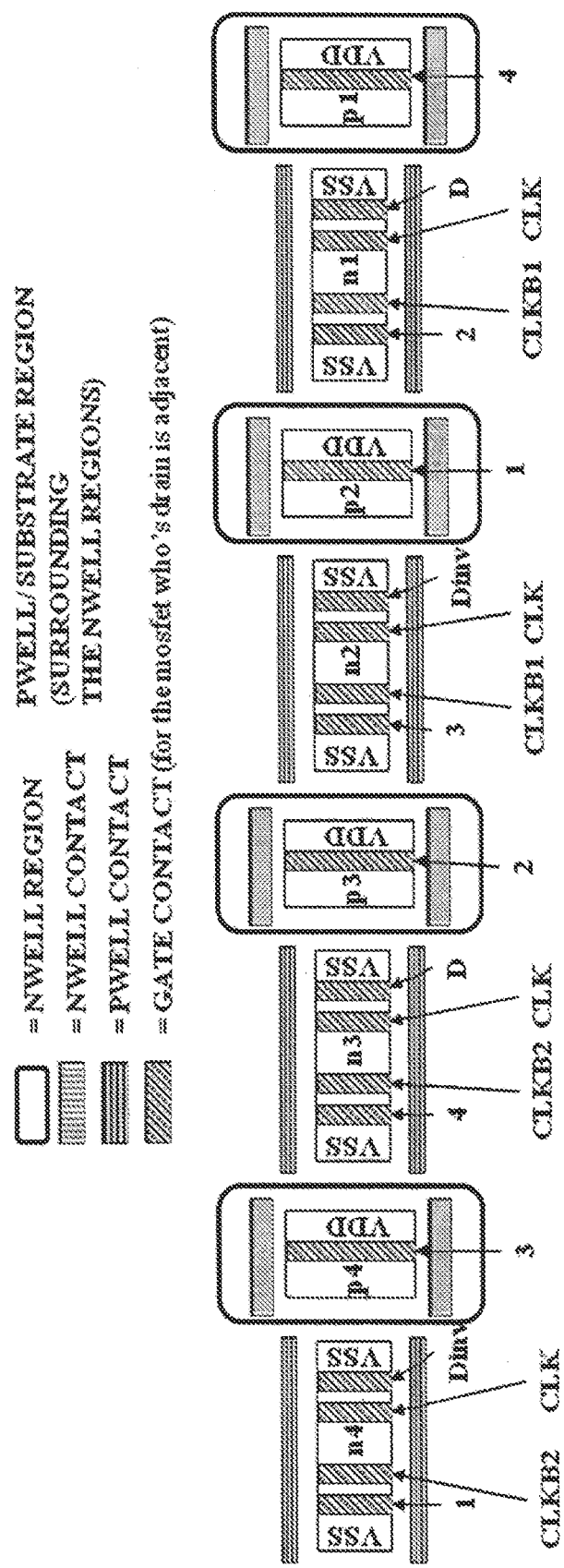
FIG. 22. Layout arrangement of the contact drain areas of the first, second, and third additional MOSFET for one of the ordering configurations of the net 1, 2, 3, and 4, for the DICE schematics in FIG. 20. The nodes n1-n4 are the n-type MOSFET drains, and p1-p4 the p-type MOSFET drains, that are connected to node 1-4 respectively. The drain areas of the additional MOSFETs are either shared with, or placed adjacent to, the drain contact area of the MOSFET, or the same type, to which they are connected. In cases where the signals Dinv, CLKB1, CLKB2 (Dinv is the inverse of the data signal, CLKB1, and CLKB2 are the inverse of the clocking signal CLK), are not available from external (to the cell) circuits, they can be generated by inserting 1 inverter (for Dinv), and one or two inverters for CLKB. These can be inserted along the line of the nodes in the layout in this figure or in other manners. One way to insert the two clock inverters in the line of the contacts, is shown in FIG. 23.

FIG. 20 shows the netlist of a DICE circuit where the clocking is accomplished by adding only n-type MOSFETs. Using this type of clocking allows the layout to maintain complete symmetry for each node in the circuit. Resulting layouts using two different node orderings, both generated using the layout methodology from U.S. patent application Ser. No. 12/354,655, are shown in FIG. 21 and FIG. 22.

Figure 23:
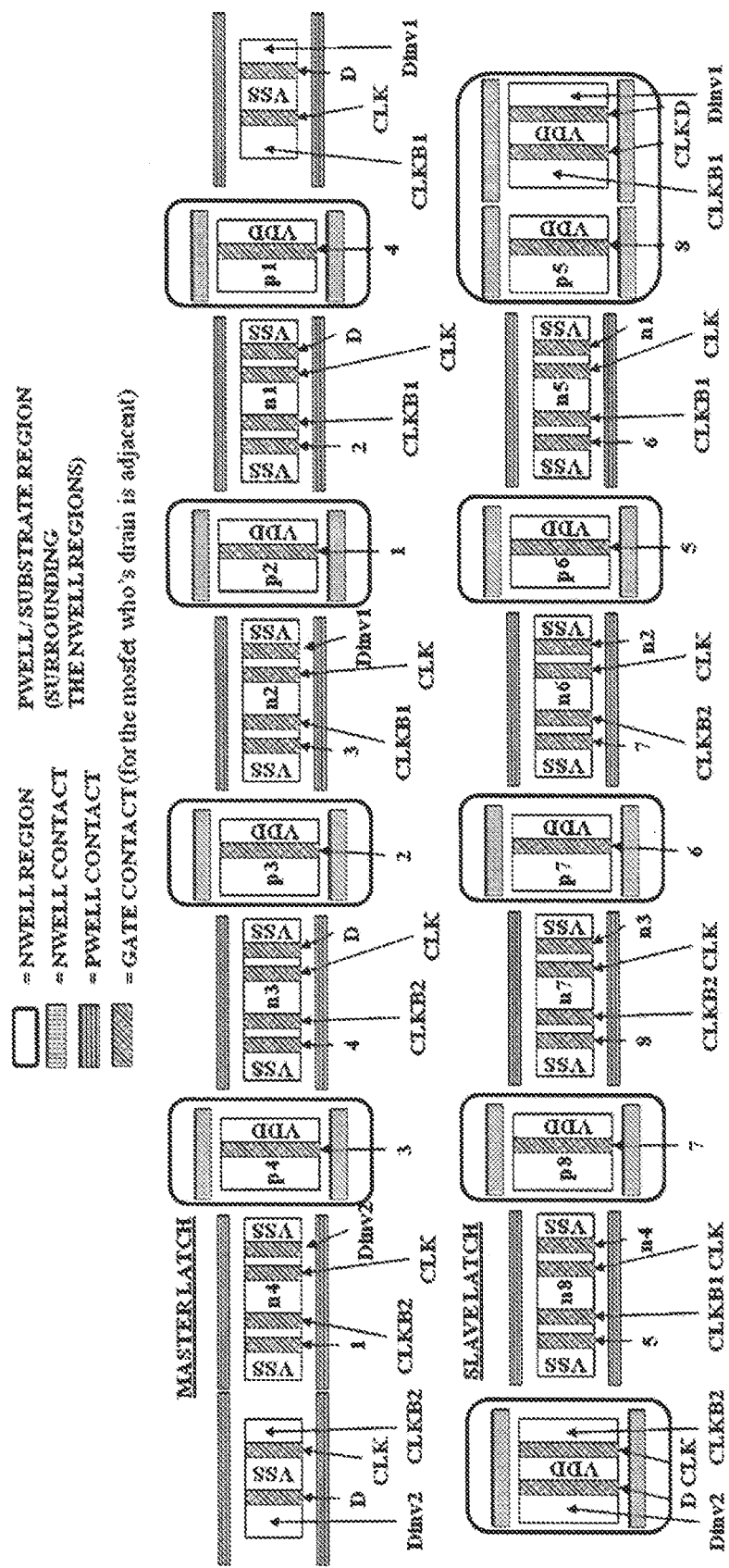
FIG. 23. Arrangement of the nodes in a layout for a DICE flip-flop based on the DICE latch the DICE schematics in FIG. 20 and the layout of FIG. 22. Two clock and two data inverters have been placed in the layout according to claim 5. Notation: n1, p1, 1 are all connected to circuit net 1, n2, p2, 2, to circuit net 2, etc.
Figure 24:
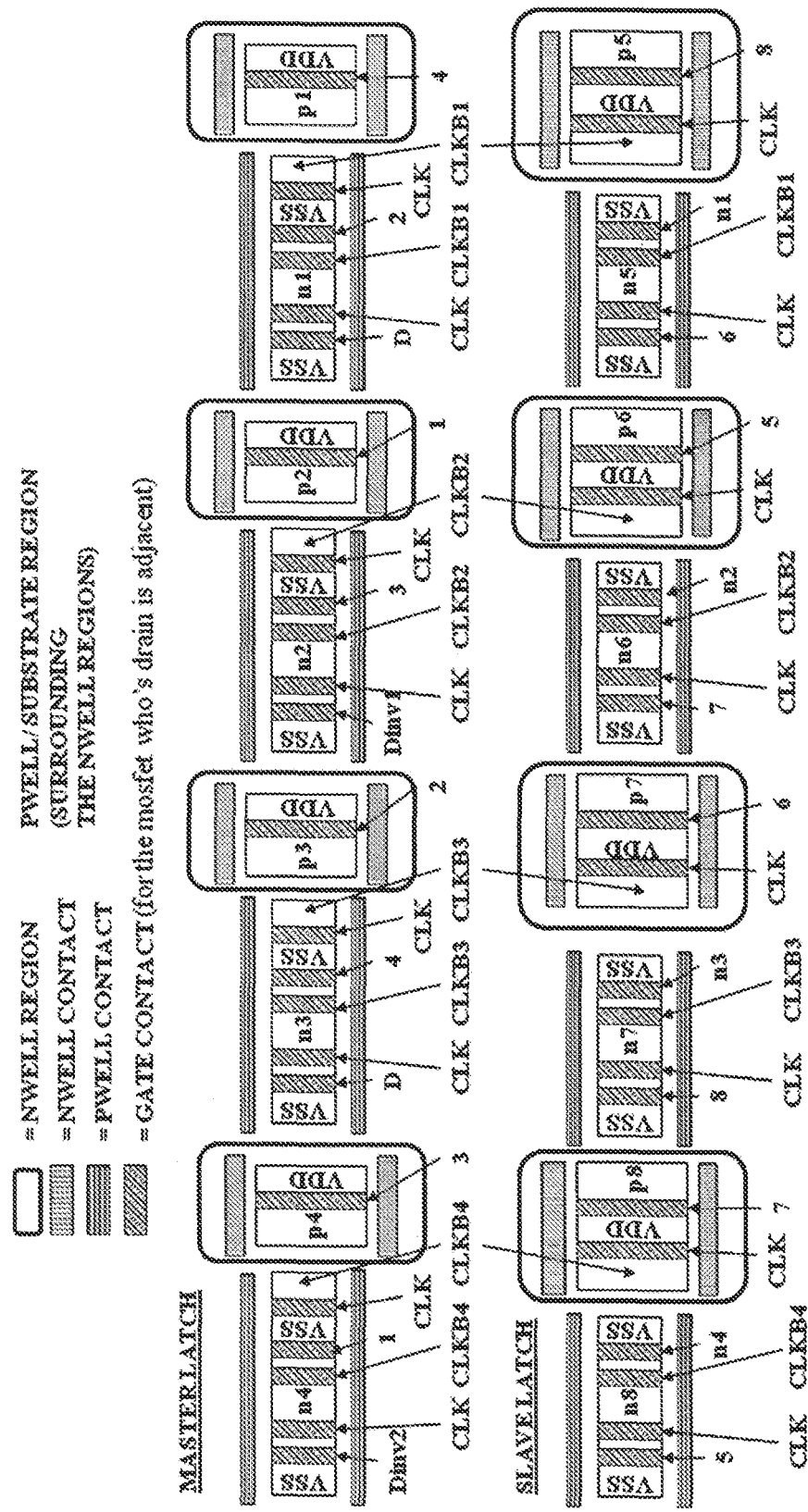
FIG. 24. Arrangement of the nodes in a layout for a DICE flip-flop based on the DICE latch the DICE schematics in FIG. 20 and the layout of FIG. 22. Two clock and two data inverters have been placed in the layout according to claim 5. Notation: n1, p1, 1 are all connected to circuit net 1, n2, p2, 2, to circuit net 2, etc.

If further additional devices (such as clock inverters, or data inverters) are added, these should be added such that they do not disrupt or remove the qualities of the layout to which they are added., i.e., they should be placed according to the layout methodology of U.S. patent application Ser. No. 12/354,655. For the DICE latch a first criteria for this is that if a single event affecting the added contact area, and affecting one second contact area, can cause a change in the DICE latch, then these two contact areas should always be separated by a third contact area for which a single event has an opposing effect. Furthermore, the new contact area should be placed such that it maintains the symmetry of the original layout, or has as small affect as possible on the original symmetry. FIGS. 23 and 24 show two specific ways to insert additional clock and date inverter contact areas in the layout for both a master and slave DICE latch in a flip-flop combination.

Figure 25:
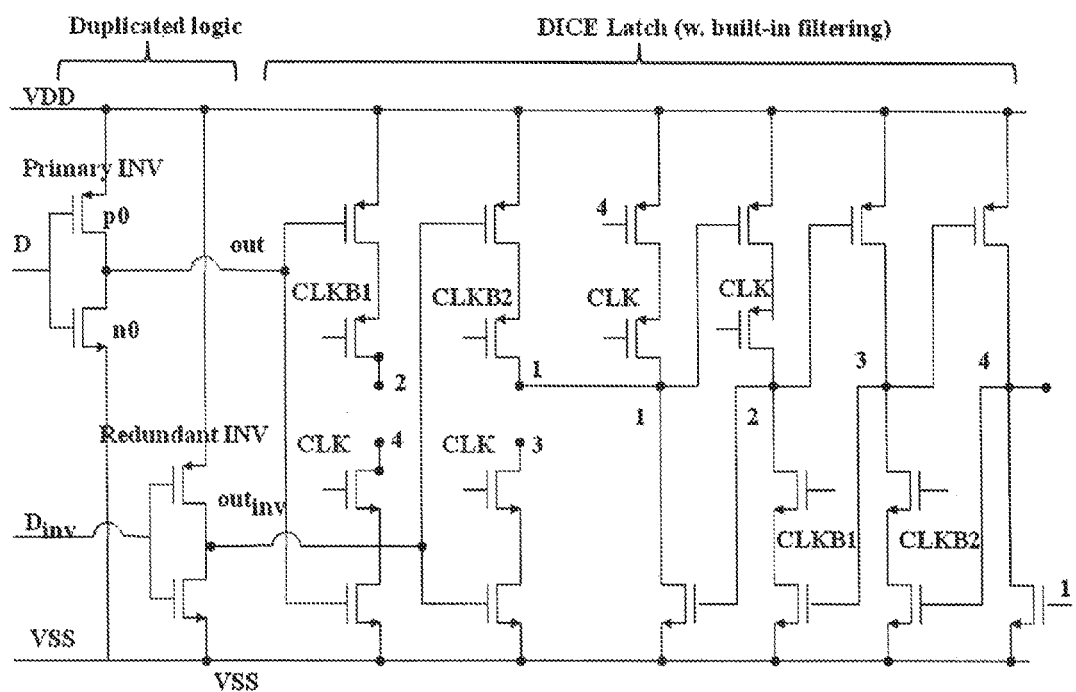
FIG. 25. New DICE clocking using the signal and the inverse signal. Duplicated logic (carrying the signal and its' inverse), feeding a DICE latch in such a way that ALL errors on either logic path are filtered directly by the latch clocking, i.e., no additional circuitry required for the filtering. Simultaneous errors on both logic paths would not be filtered. However, using the technique in this invention, the logic can be laid out in such a way that no such errors occur. Note, CLKB1 and CLKB2 in this schematic could, if a CLKB is supplied from the outside of the cell, be the save signal, i.e., this CLKB. If the inverse of the clock is generated in the cell itself, there should be two CLKB, 1 and 2, in the same way as is done for the "regular" DICE clocking.

FIG. 25 shows the netlist of a DICE circuit where the clocking is accomplished by adding a full (conventional) clocking (using both p-type and n-type MOSFETs) to one node in the original netlist (here node 2), and adding a clocking by only n-type MOSFETs to the subsequent node (here node 3), and by only p-type MOSFETs to the preceding node (here node 1), whereby the data signal is clocked in to the first node (node 2) and the inverse of the data signal into the other two nodes (node 1 and 3). This type of clocking has the property that if the signal clocked into the first node (2) is NOT the inverse of the signal clocked into the other two nodes (1, 3) then the new data will not be clocked in, and the latch will retain the original value of the stored data when the clock is turned off. In other words, this clocking configuration acts as a filter for two signals which should be the inverse of each other (such as is the case for the combinational logic discussed below). This way of inserting the clocking into the basic DICE netlist does not preserve the symmetry of each node in the basic DICE circuit. However, it has the symmetry property that the combination of node 1 and 3, have the same surrounding as the combination of node 2 and 4, i.e., it has a higher degree of symmetry than a traditional clocking, where the data is clocked into node 1 and 3 (or node 2 and 4) both by n-type and p-type MOSFETs. The layout for the netlist in FIG. 25 is generated by adding the additional contact areas (and hence MOSFETs) adjacent to the nodes to which they are connected in the most symmetric way possible.

Figure 26:
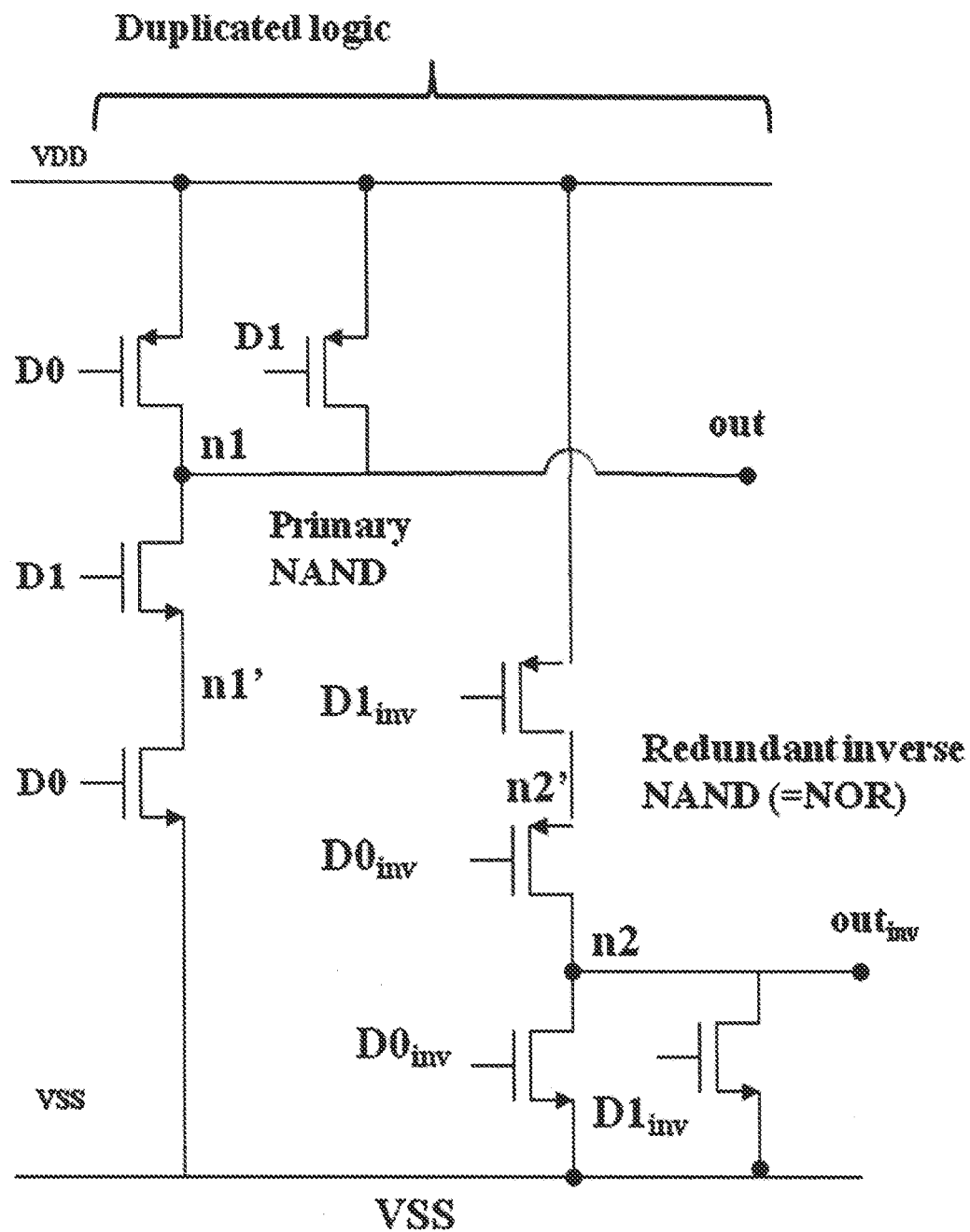
FIG. 26. Example of duplicated logic carrying the signal and its' inverse. A NAND gate and the inverse NAND gate (i.e., a NOR gate).
Figure 27:
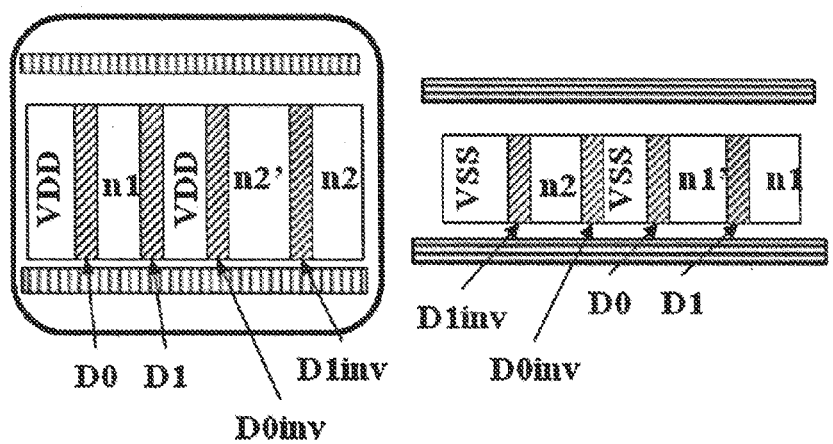
FIG. 27. Principal layout, using the new layout technique, for the duplicated NAND gate from FIG. 26). As the primary NAND always carry the opposite signal of the redundant NAND (=NOR), this layout ensures that an error can only affect one of the signal paths, never both paths.

This invention also concerns the application of the layout methodology to combinational logic. In U.S. patent application Ser. No. 12/354,655 general method was invented which uses redundant logic. Based on that method, this invention specifies a particular way to construct such redundant logic gates from regular (non-redundant) logic gates. Once such a redundant gate has been constructed it can be laid out using the layout methodology in U.S. patent application Ser. No. 12/354,655. This invention also contains a specific redundant NAND gate, constructed in this way, and it's principal layout configuration. The duplicated redundant NAND gate netlist and principal layout are shown in FIGS. 26 and 27, respectively.

Figure 28:
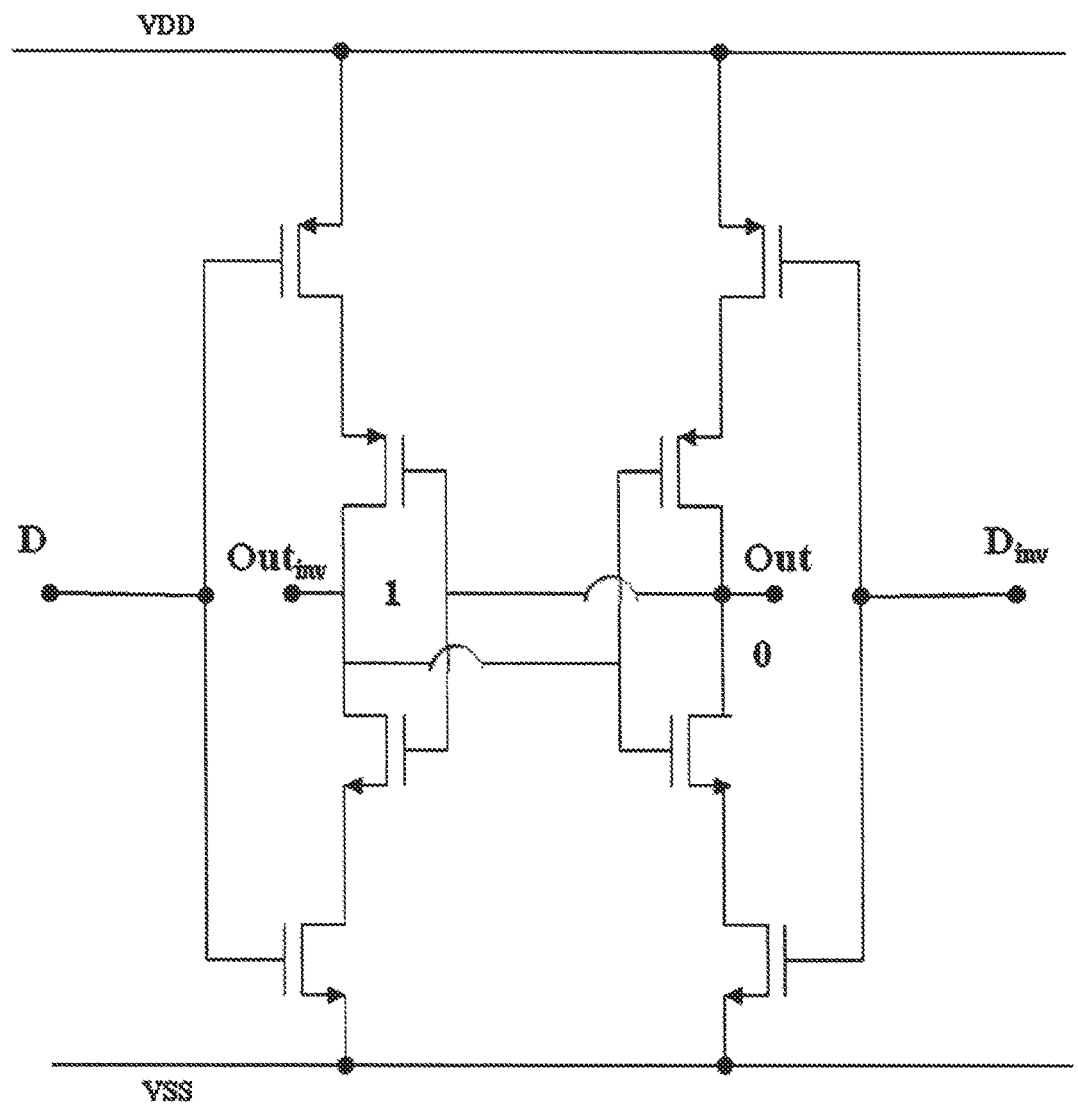
FIG. 28. Filter cell for dual inverse logic. The two output nodes of this circuit are numbered 0 (out) and 1 ($out_{inv}$).
Figure 29:
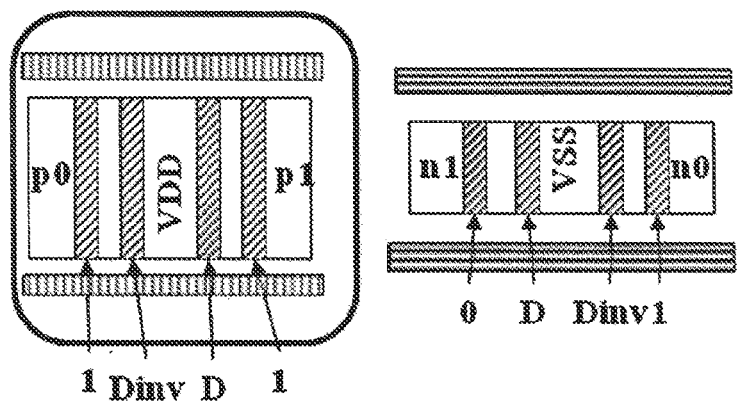
FIG. 29. Layout using the new layout methodology for the filter shown in FIG. 28. n0 and p0 are the n-type and p-type drain contact area of the output node 0 (out), respectively, and n1 and p1 are the n-type and p-type drain contact area of the output node 1 ($out_{inv}$), respectively.

When a duplicated logic is used, then either errors need to be filtered before they are latched into sequential elements, or, alternatively, both combinational logic and sequential elements are duplicated for portions of the circuit, and at the output of this circuit portion the error can be detected. In the latter case, the error is not automatically corrected, but rather some other means to correct the error must be invoked, e.g., a repeat of the activity in the circuit portion that generated the error. In the former case, a filter is applied before every latch, which only allows the latch to read in data only when the two duplicated signal are (correctly) the inverse of each other. One way to accomplish such filtering is by using the filtering DICE latch described above. Alternatively it may be advantageous to introduce a stand-alone filter, either prior to a regular latch, or somewhere else in the chain of combinational logic. This filter should be such that a signal is only allowed to pass when the two inputs are (correctly) the inverse of each other. If the two input signals are the same, the filter should block the signal. The netlist using two coupled c-elements (FIG. 28), where the output of one c-element is coupled to one of the inputs of the other c-element, is a way to realize such a filter. This filter circuit is such that it can be laid out according to the new layout methodology, making the filter itself hard to single event upsets. The combined circuit (FIG. 28) and layout (FIG. 29) of this filter is part of this invention.

An alternative to a duplication of the logic signal is to use triple mode redundancy (TMR), in which three copies of the same logic signal is carried by three copies of the logic gates, and a voting among the three signals is applied to correct errors to one of the three signal copies. In such circuits a voting circuit needs to be used, which itself should be very hard against single event errors. This invention entails two different interleaved DICE-type latches, which takes three signals as input and performs a voting on these three signals upon latching in a new data. If one of the three input signals has an error, i.e., is different from the other two, these latches will, upon closing (switching from open (transparent) to closed (opaque)) correct the erroneous input signal. Both these voting latches are such that they effectively can be laid out using the layout methodology of U. S. patent application Ser. No. 12/354,655.

Figure 30:
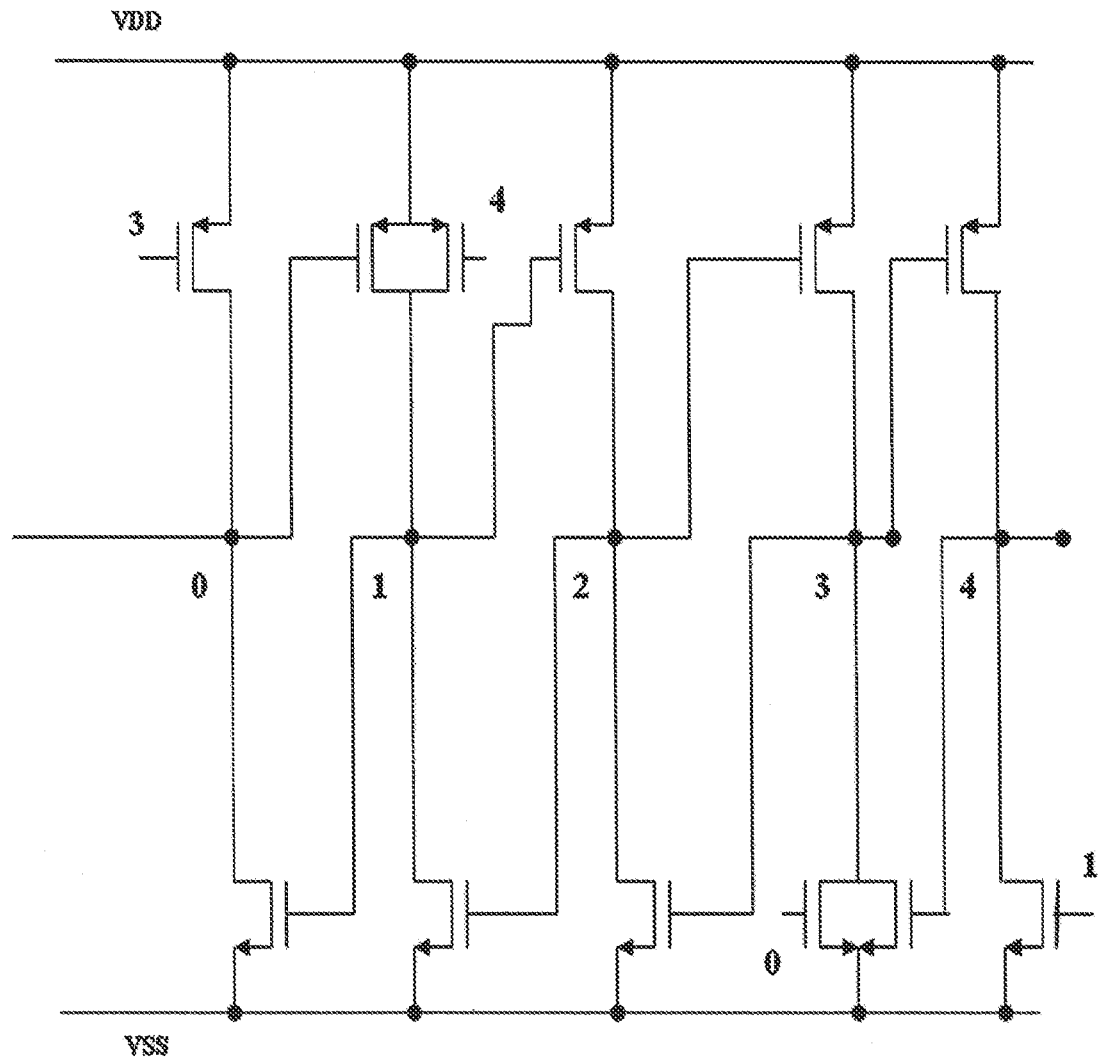
FIG. 30. Basic Double Dual interlocked cell (DICE) latch for a voting circuit.
Figure 31:
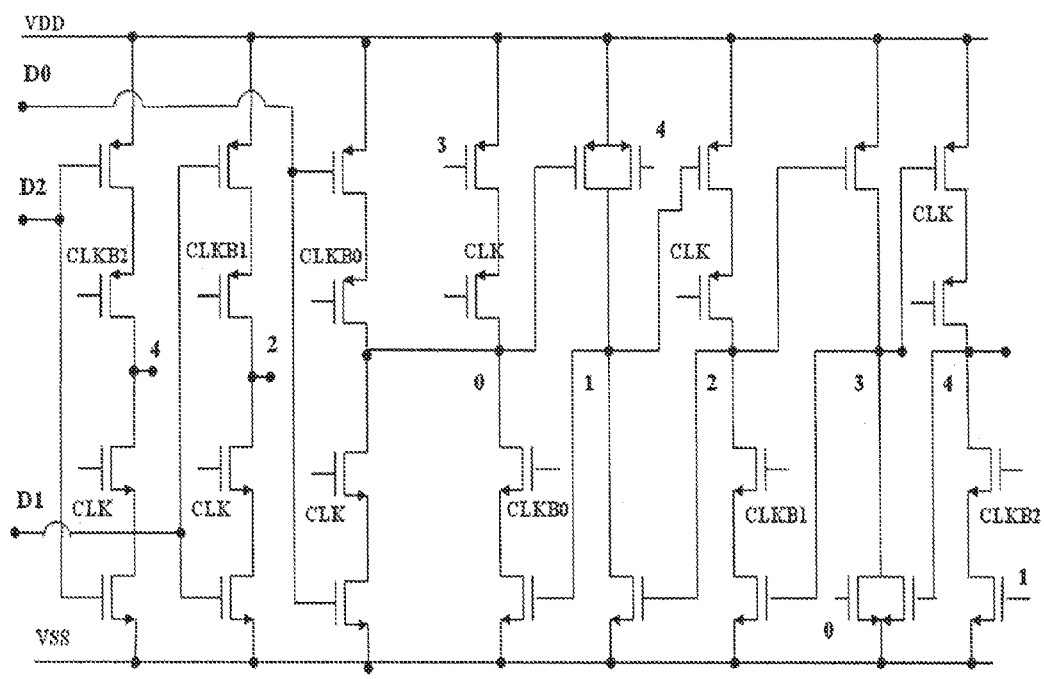
FIG. 31. Double Dual interlocked cell (DICE) latch with voting including a first variant to introduce clocking D, and Dinv, are the data input and inverse of data input, respectively, CLK is the clock, and CLKB0, CLKB1 and CLKB2 are the inverse of the CLK. The inverse of the CLK is here included as three separate signals CLKB0, CLKB1 and CLKB2, the claims also cover the case where CLKB0, CLKB1 and CLKB2 are the same signal (or interchanged with respect to how they are connected into the circuit).
Figure 32:
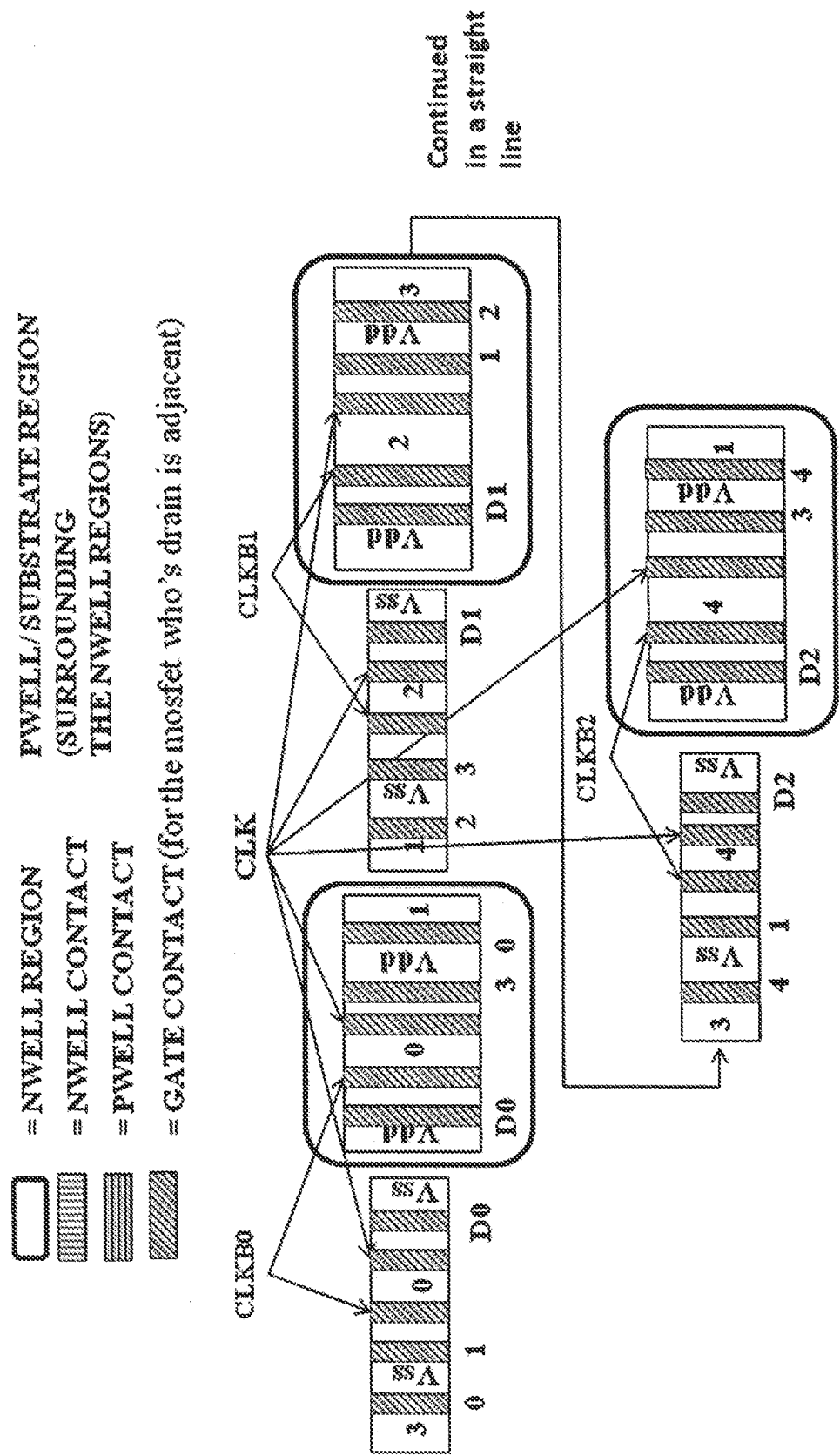
FIG. 32. One of the possible arrangements of the nodes in the double DICE voting circuit from the schematics in FIG. 31. The nodes n0-n4 are the n-type MOSFET drains, and p0-p4 the p-type MOSFET drains, that are connected to node 0-4 respectively. Cyclic permutation of the nodes included in the claims, as well as any position switch of any two odd p-drain, odd n-drain, even p-drain, even n-drain node pairs.

The basic netlist (without clocking transistors) of the first voting latch is shown in FIG. 30. It consists of two inter-coupled DICE latches, which share three storage nodes. FIG. 31 show the same voter circuit, but with added MOSFETs to accomplish the clocking. A layout for this voting latch, generated according to the methodology in U.S. patent application Ser. No. 12/354,655, is shown in FIG. 32.

Figure 33:
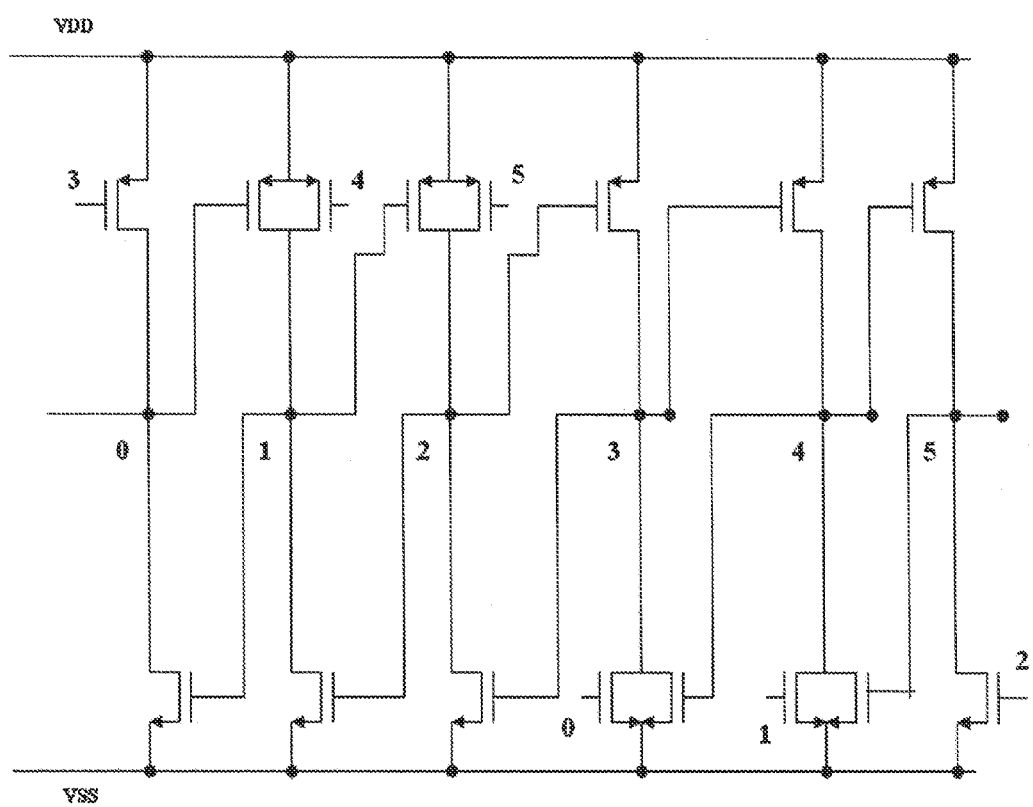
FIG. 33. Basic Triple Dual interlocked cell (DICE) latch for a voting circuit.
Figure 34:
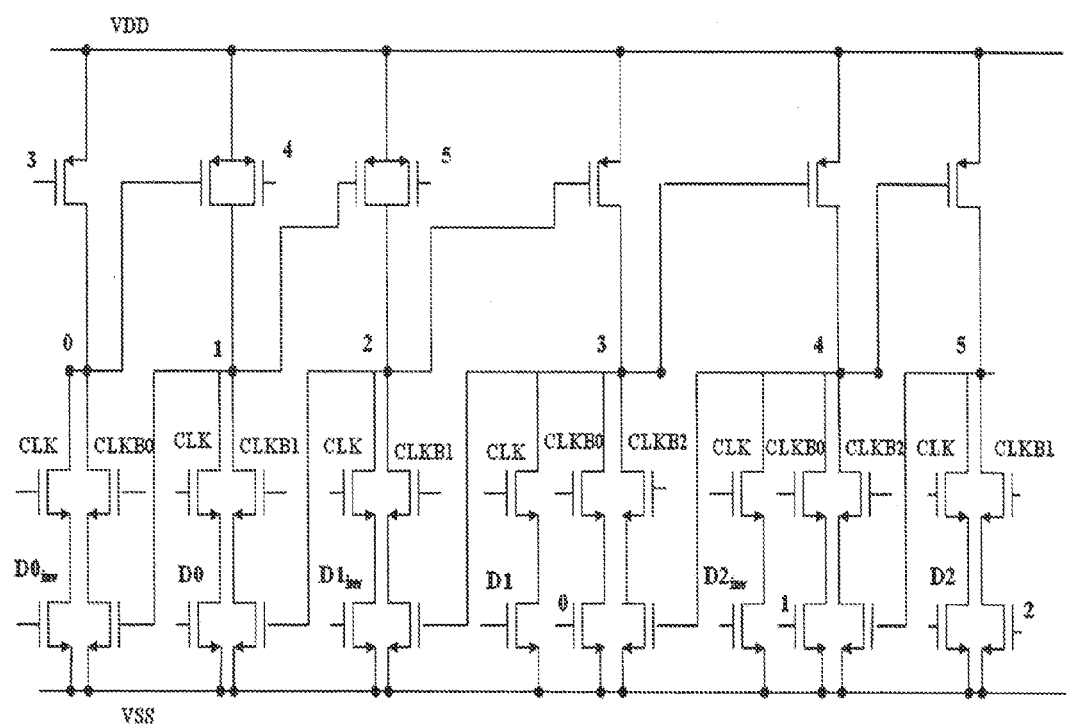
FIG. 34. Triple Dual interlocked cell (DICE) latch with voting including a first variant to introduce symmetric clocking D, and Dinv, are the data input and inverse of data input, respectively, CLK is the clock, and CLKB0, CLKB1 and CLKB2 are the inverse of the CLK. The inverse of the CLK is here included as three separate signals CLKB0, CLKB1 and CLKB2, the claims also cover the case where CLKB0, CLKB1 and CLKB2 are the same signal (or interchanged with respect to how they are connected into the circuit).
Figure 35:
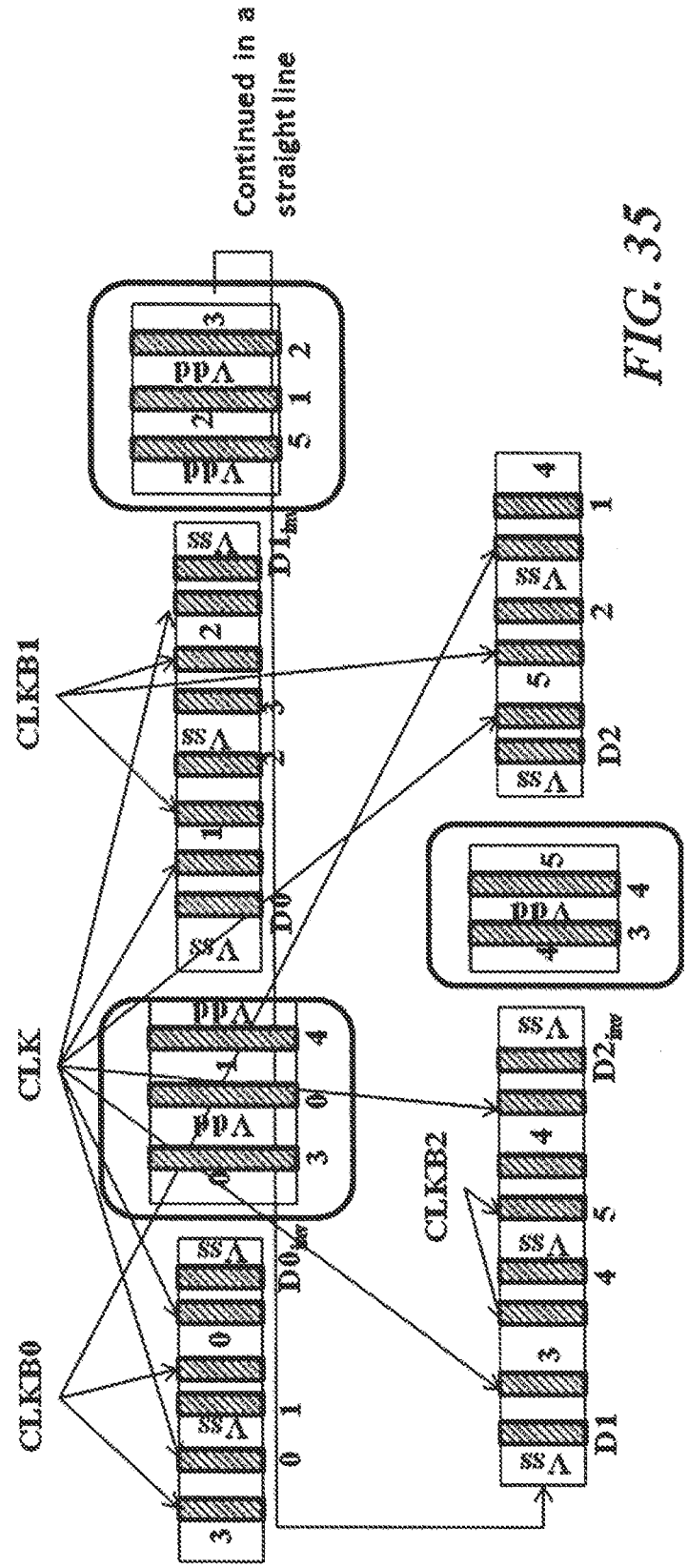
FIG. 35. One of the possible arrangements of the nodes in the triple DICE voting circuit from the schematics in FIG. 34. The nodes n0-n5 are the n-type MOSFET drains, and p0-p5 the p-type MOSFET drains, that are connected to node 0-5 respectively. Cyclic permutation of the nodes included in the claims, as well as any position switch of any two odd p-drain, odd n-drain, even p-drain, even n-drain node pairs.

The basic netlist (without clocking transistors) of the second voting latch is shown in FIG. 33. It consists of six storage nodes, forming a three inter-coupled DICE latches, each consisting 4 non-identical storage nodes and where the first latch share 3 nodes with the second latch, and two nodes with the third latch, and the second and third latch share 3 nodes. Whenever in the construction of each DICE connection, two different nodes need to be connected to the same gate, then the MOSFET of this gate is replaced by tow parallel MOFETS of the same type, and each of the two signals is connected to the gates of one of these parallel MOSFETs, so that no two nodes are connected to the same gate. For this second voting latch, it is possible to introduce the clocking by using only MOSFETs of one type, which better preserves the symmetry of the original circuit. FIG. 34 show the same voter circuit, but with added MOSFETs, only of n-type, to accomplish clocking. A layout for this voting latch, generated according to the methodology in U.S. patent application Ser. No. 12/354,655, is shown in FIG. 35.

The duplicated logic discussed above is such that only one, but never both of the two signals carried by the logic can have an error at a particular time, but never both. When several of these type of duplicated logic cells are connected to form a combinational logic chain, there is a possibility that an error pulse is generated on one of the signals in a certain gate, and that an error signal is generated on the other signal (by the same single event) in another logic gate. If the connection of these two logic gates is such that these two current pulses can overlap in time, then both of the duplicated signals could be wrong and the filtering would not work. However, the nature of the layout of the duplicated logic cells described above will be such that if they are placed in a certain way relative to each other, then it can be ensured that if the single event generates an error pulse in both the cells, then it will always be on the same signal (i.e., this error will be filtered by the filtering described above).

The layout for duplicated logic gates generated using the methodology in U.S. patent application Ser. No. 12/354,655 will generally have all nodes placed along a line in the layout. A concrete example is the duplicated NAND gate discussed above. If two such cells are placed next to each other along this line in the layout, and such that the contact area(s) which are closest to the abutting edge of the two cells are such that a single event that affects these nodes generate an error pulse on the same signal, then it is ensured that there can be no single event affecting these two cells that can generate a single event on both of the two signals carried by the logic.

Figure 36:
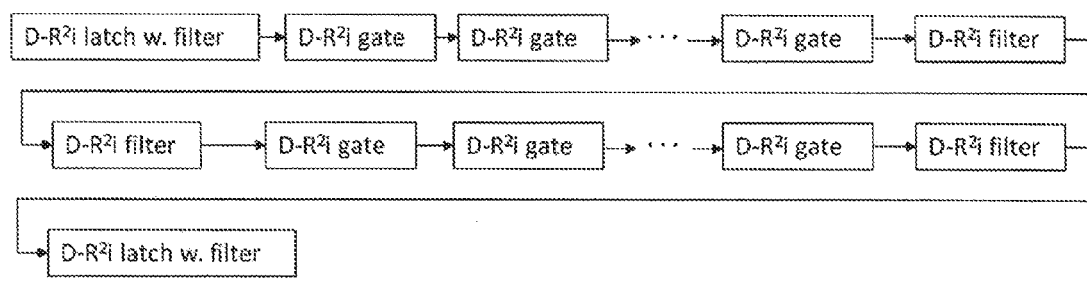
FIG. 36. Example of the layout arrangement. Combinational cells ($D-R^2i$ gate) are generated using the technique from U.S. patent application Ser. No. 12/354,655. These gates are such that they individually are hard against all errors. The cells are also hard against inter-cell single-events that occur along the long direction of the cells (horizontally in the figure). Such cells occur, e.g., in a logic which uses duplicated logic carrying the man data signal and the inverse of the main data signal. However, the cells are such that inter-cell errors that affect two cells and hit the cells perpendicular to the long direction (vertically in the figure) can (depending on the implemented logic functions) generate an error in the circuit. The arrangement places as many of the combinational gates as can be allowed by general considerations (such as area routing etc.) along the direction for which no errors can be generate (neither by intra-nor by inter-cell single events), and at the end of each chain, places a filter cell which is such that is prevents inter-cell single events between cells separated by the filter, from generating overall circuit errors. The filters can be either a plain filter ($D-R^2i$ filter) or a combined latch-filter ($D-R^2i$ latch w. filter).

This invention devices a way to generate a layout for a combination of duplicated logic gates, described above, by: 1) an analysis of each pair of logic gates to determine if the logic connections permit an error pulse on one of the two signals in one gate, and on the other (inverse) signal in the other gate, to propagate and to overlap in time by the time they reach the next filtering point in the circuit; and 2) if this is the case, then the two gates are placed in the logic in a way that their relative placement and orientation is such that error pulses generated in both cells by one single event, always will be on the same signal. Typically this will cause several cells to be placed along a line in the layout (see FIG. 36). This type of placement is carried through as long as it is possible and does not cause to big problems, and the chain is always terminated by a filtering (either a filtering latch or a stand-alone filter cell, e.g., of the types discussed above). Thirdly, the logic is continued, after the filter, either following the placement strategy above (e.g., along the line) or at a point far enough from the filter (or latch), such that an error pulse generated at the output of the filter (or filtering latch) and in the following logic element, generated by the same single event, is very unlikely (due to the physical separation of these two elements). A principal such arrangement is shown in FIG. 36.

This invention also devises a way to apply the general layout methodology of U.S. patent application Ser. No. 12/354,655 to reduce, or prevent single event generated errors in certain combination of cell, without necessarily reducing or preventing errors in any single cell. This is accomplished by, according to the methodology in U.S. patent application Ser. No. 12/354,655, placing two contact area of a circuit cell, for which a single event has opposite effect on the state of the circuit, close to each other. This, in itself, will cause some reduction in the single event error rate of the cell. Furthermore, for single events that are in a direction that maximizes the effect on both cells (i.e. caused by charged particles travelling in a direction that passes directly through both of these contact areas, there will be a particularly strong reduction in the overall effect on the circuit caused by the single event and hence a stronger reduction in error rate for these type of events (Digure 37).

Figure 37:
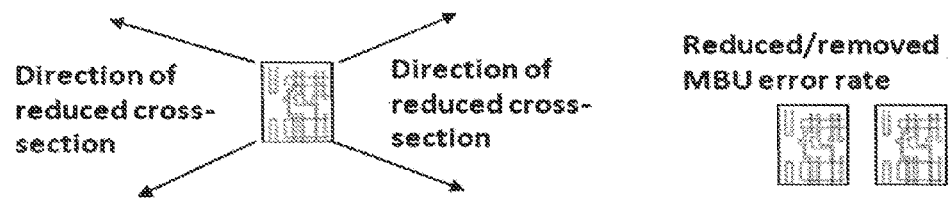
FIG. 37. Illustration of how to apply the new layout methodology to reduce MBU rate (but not necessarily removing single errors).
Figure 38:
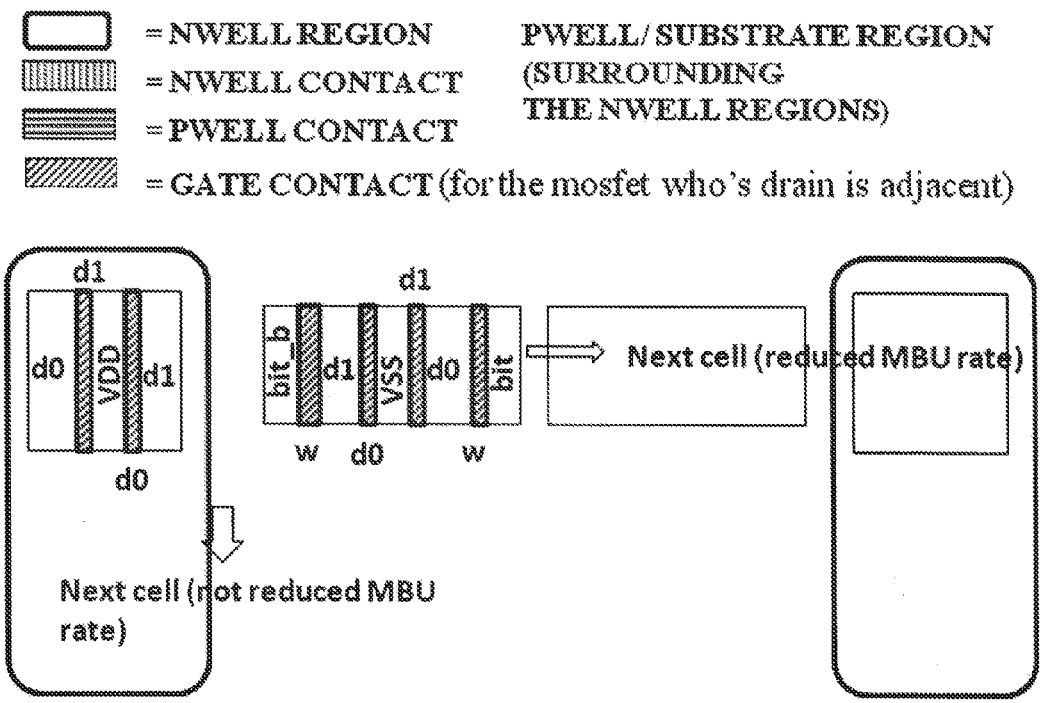
FIG. 38. SRAM cell laid out to have a reduced error cross-section in the horizontal direction (the direction of "Next SRAM cell (same word)"). d0 and d1 are the stored data, w is the word line, bit, and bit_b are the bit lines.

If other cells are placed next to the first cell in the direction of reduced single event impact, and these other cells have a layout and orientation which also reduces the single event impact in the same direction as the first cell, then the effect of a single event that affect two, or more, of these cell, and hence has the direction of these cells (i.e., the direction of reduced impact, will be strongly reduced). Hence the probability to generate an error in two, or more, of these cells, by one single event, will be strongly reduced, compared to the case when the cells are placed next to each other in a direction that does not have this reduced single event impact (see FIG. 37). An example application of this inter-cell arrangement is for an SRAM cell array (e.g., see FIG. 38).

Finally, a specific implementation of the method in claims 1-4 of U.S. patent application Ser. No. 12/354,655 is devised, whereby each, or some contact areas, are connected, via a MOSFET to another contact area of the same type which is connected to one of the power lines. For an n-type drain contact area, an n-type MOSFET is added next to said contact area, the source of which is connected to the high power (VDD), and the gate of which is always connected to the low power (VSS). While this MOSFET will always be off during regular operation, the adjacent contact area (connected to VDD) will help reduce the effect of a single event on the first contact area, by collecting some of the single event charge and by, pulling the voltage of the first contact area towards VDD (this is an advantage since for n-type drains in a CMOS technology, a single event only generates an error signal when the data value on the node connected to the contact area is high, if the data value is low, a single event will try to pull the value on the node still lower, which will not cause an error). Similarly, for a p-type drain contact area, a p-type MOSFET is added next to said contact area, the source of which is connected to the low power (VSS), and the gate of which is always connected to the high power (VDD).

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office, the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

What is claimed is:

1. A sequential logic cell (also referred to as a latch), comprising:
   a. four inverter circuits, each inverter:
      i. comprising at least one p-type MOSFET and at least one n-type MOSFET;
      ii. connected as a Dual Interlocked Cell (DICE), the DICE cell having four nets (numbered 1,2,3,4), each net:
         1. connected to:
            a. one inverter output and to two gates, such that the n'th net is connected to the output of the n'th inverter,
            b. to gate of the p-type MOSFET of the (n+1)'th inverter, and
            c. to the n-type MOSFET gate of the (n−1)'th inverter, in a cyclic manner (such that when n=0, then n−1 refers to the 4'th net, and when n=4 then n+1 refers to the first net), nets 1 and net 3 carrying the same voltage state and net 2 and net 4 carrying the inverse of the voltage state of net 1 and net 3,
         2. comprising:
            a. one p-type drain contact area (denoted p1, p2, p3, p4); and
            b. one n-type drain contact area (denoted n1, n2, n3, n4), these contact areas being the original drain contact areas, the MOSFETs of these contact areas being the original 8 MOSFETs, and the DICE circuit cell formed by these MOSFETs the original circuit cell,
   b. an arrangement where the contact areas of each of the four nets, are placed along a straight line in the layout; and
   c. the drain contact areas are placed along the straight line in the layout in any of the following orders:
      i. n3, n4, p4, p1, n1, n2, p2, p3;
      ii. n4, n3, p4, p3, n2, n1, p2, p1;
      iii. n2, n3, p4, p3, n2, n1, p2, p1;
      iv. n4, n1, n3, n2, p3, p2, p1, p4;
      v. n1, n4, n3, n2, p2, p3, p4, p1;
      vi. n1, n4, n3, n2, p4, p3, p2, p1;
      vii. n4, p4, n3, p3, n2, p2, n1, p1 and
      viii. any order that can be derived naturally from these configuration, under consideration of the circuit symmetry, including cyclic permutations, or an interchange of the following drain contact area pairs:
         1. [n1, n3];
         2, [n2, n4];
         3. [p1, p3]; and
         4. [p2, p4].

2. The sequential logic cell according to claim 1, further comprising a first set of additional MOSFETs, said set of additional MOSFETs comprising one or more additional MOSFETs, that perform clocking in of a data into the sequential logic cell, comprising: a) an arrangement where the drain contact areas of the first set of additional MOSFETs are placed along the same straight line as the drain contact areas of the original MOSFETs, and such that the drain contact areas of the first additional MOSFETs are either shared with, or placed adjacent to the original drain contact areas of the same type (n-type or p-type), to which they are connected.

3. The sequential logic cell according to claim 2 whereby the additional MOSFETs are added in such a way that they, to the extent permitted by the circuit netlist, keep the symmetry of the original sequential DICE circuit and layout from claim 1, comprising: a) an arrangement where the additional MOSFETs are added in such way that the same number and type of additional MOSFETs am connected in the same way to each of the original nets in the original circuit, or b) an arrangement where the additional MOSFETs are added in such a way that the combined added MOSFETs to two first non-consecutive circuit nets in the original circuit (which carry the same signal), has the same number and type of additional MOSFETs, and the same connections, as the combined added MOSFETs to the two other non-consecutive circuit nets in the original circuit (which carry the opposite signal as the first two non-consecutive circuit nets).

4. The sequential logic cell according to claim 1, comprising: a) an arrangement where a first additional n-type MOSFET is connected in series to each original n-type MOSFET in the DICE latch circuit; and b) an arrangement where a second and a third n-type MOSFET is connected in series with each other, and in parallel to each of the original and first added n-type MOSFET, whereby the gate of the third added MOSFET of net 1 and 3 is connected to a data signal, the gate of the third added MOSFET of net 2 and 4 is connected to the inverse of said data signal, the gate of the second added MOSFET (for each net) is connected to a docking signal, and the gate of the first added MOSFET to the inverse of said locking signal; and c) the drain contact areas of the added MOSFETs are either shared with, or placed adjacent to, the drain contact area, or the same type, of the original MOSFET to which they are connected.

5. The sequential logic ceil according to claim 1, comprising: a) an arrangement where a first additional p-type MOSFET is connected in series to each original p-type MOSFET in the DICE latch circuit; and b) an arrangement where a second and a third p-type MOSFET is connected in series with each other, and in parallel to each of the original and first added p-type MOSFET, whereby the gate of the third added MOSFET of net 1 and 3 is connected to a data signal, the gate of the third added MOSFET of net 2 and 4 is connected to the inverse of said data signal, the gate of the first added MOSFET (for each net) is connected to a clocking signal, and the gate of the second added MOSFET to the inverse of said clocking signal; and c) the drain contact areas of the added MOSFETs are either shared with, or placed adjacent to, the drain contact area, or the same type, of the original MOSFET to which they are connected.

6. The sequential logic cell according to claim 4 or claim 5, which contains further extra additional MOSFETs which are used to generate one or more nets carrying the inverse of the data signal and one or more nets carrying the inverse of the clocking signal, comprising: a) an arrangement where the contact areas of the extra additional MOSFET are added to the layout in such a way that they minimize the disruption of the symmetry of the original layout; and b) if of any of the extra additional MOSFETs is such, that a single event affecting a first contact area of one of these extra additional MOSFETs, and one other second contact area of the DICE element, can cause a change of the state of the whole element, then this first contact area is placed along the straight line in the layout at a position as far as possible from the second contact area.

7. The sequential logic cell according to claim 1, further comprising: a) an arrangement where two first additional n-type MOSFETs are connected in series to the original n-type MOSFET connected to node 1 and 2 in the DICE latch circuit, respectively, and two first p-type MOSFETs are connected in series to the original p-type MOSFET connected to node 1 and 4 in the DICE latch circuit, respectively, and for each of the two MOSFETs thus connected in series, a second and a third MOSFET, of the same type, is connected in series with each other, and in parallel to each the original and first additional MOSFET, at the positions in the circuit where the first additional MOSFET has been added, whereby the gates of the third added MOSFETs of net 1 are connected to a data signal, the gates of the third added MOSFETs of net 2 and 4 are connected to the inverse of said data signal, the gate of the second added n-type MOSFETs and first added p-type MOSFETs are connected to a clocking signal, and the gate of the first added n-type MOSFETS and second added p-type MOSFET to the inverse of said clocking signal, hence creating a filtering latch for the data and inverse data signal; or b) an arrangement the MOSFETs are added in an equivalent manner to 3 other nodes in the original DICE circuit, e.g., by cyclic permutation; and c) the drain contact areas of the added MOSFETs are either shared with, or placed adjacent to, the drain contact area, or the same type, of the original MOSFET to which they are connected.

8. The logic cell of claim 7, further comprising:
a. a set of connected duplicated combinational cells placed relative to each other such that a single event that affects two or more cells cannot create an error, which is such that it can create an error in the overall circuit function, on both of the signals carried by the duplicated logic; and
b. a filter placed at the end of the set of cells such that it would prevent an error on one of the two duplicated logic signals to propagate, hence decoupling the cells in the set from cells outside the set, with respect to the action on the overall circuit, of a single event that (simultaneously) affects the set and any other cell, not part of the set.

9. An electronic circuit comprising:
a. five circuit nodes forming two inter-coupled DICE latches of the type in claim 1;
b. two DICE latches that share 3 of the storage nodes and the individual devices connected to these 3 nodes;
c. in the inter-coupled DICE circuit, if signals from two different nodes, which are not shared, are connected to the same gate of a MOSFET whose drain is connected to one of the shared nodes, then this MOSFET is replaced by two parallel MOSFETs of the same type, and one of the signals is connected to one of the two parallel MOSFETs and the other signal to the other parallel MOSFET;
d. means to clock in a ,data signal, the circuit containing an error correction method which corrects for single errors, comprising:
  i. an arrangement where all drain contact areas in the circuit are arranged in a straight line in the layout; and
  ii. where, if px is the drain of the p-type MOSFET, and nx the drain of the n-type MOSFET drain, which is connected to node x, and the adjacent nodes in the DICE schematic are ordered 0, 1,2, 3,4, the drain contact areas along the straight line are ordered according to the following node orders: [n0, p0, p1, n1, n2, p2, p3, n3, n4, p4], as well as any cyclic permutation of this order, and any order where the following nodes are interchanged: odd n-type, even n-type, odd p-type, odd n-type pairs including [n4, p4, n3, p3, n2, p2, n1, p1, n0, p0].

10. The electronic circuit of claim 9, further comprising:
a. wherein two n-type drain contacts or two p-type drain contacts occur twice in the layout, the two nodes of the same type can be inserted next to each other, or next to other nodes, as long as a single event has an opposite effect on the voltage state of the contact areas, such as an arrangement order as follows: [n3, n0, p0, p1, n1, n2, p2, p3, n3, n4, p4, p1].

* * * * *